(12) United States Patent
Swager et al.

(10) Patent No.: US 6,323,309 B1
(45) Date of Patent: Nov. 27, 2001

(54) CONDUCTING POLYMER TRANSITION METAL HYBRID MATERIALS AND SENSORS

(75) Inventors: Timothy M. Swager, Newton; Richard Kingsborough; Shitong S. Zhu, both of Somerville, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/201,743

(22) Filed: Dec. 1, 1998

Related U.S. Application Data

(60) Provisional application No. 60/067,200, filed on Dec. 1, 1997.

(51) Int. Cl.$^7$ ............................. C08G 73/06; C08G 75/00

(52) U.S. Cl. ........................... 528/380; 528/377; 528/423

(58) Field of Search ................................... 528/380, 377, 528/423

(56) References Cited

U.S. PATENT DOCUMENTS

| | | |
|---|---|---|
| 4,839,112 | 6/1989 | Wynne et al. . |
| 4,957,615 | 9/1990 | Ushizawa et al. . |
| 4,992,244 | 2/1991 | Grate . |
| 5,091,502 | 2/1992 | Narang et al. . |
| 5,250,439 | 10/1993 | Musho et al. . |
| 5,312,896 | 5/1994 | Bhardwaj et al. . |
| 5,387,462 | 2/1995 | Debe . |
| 5,493,017 | 2/1996 | Therien et al. . |
| 5,549,851 | 8/1996 | Fukushima et al. . |
| 5,675,001 | 10/1997 | Hoffman et al. . |

OTHER PUBLICATIONS

P. Audebert et al, "Synthesis and Characteristics of New Redox Polymers Based on Copper Containing Units; Evidence for the Participation of Copper in the Electron Transfer Mechanism", New Journal of Chemistry, vol. 15, No. 4, pp. 235–237, 1991.

K.A. Goldsby et al., "Oxidation of Nickel(II) Bis(salicylaldmine) Complexes: Solvent Control of the Ultimate Redox Site", Polyhedron, vol. 8, No. 1, pp. 113–115, 1989.

L.A. Hoferkamp and K.A. Goldsby, "Surface–Modified Electrodes Based on Nickel(II)and Copper(II) Bis(salicylaldimine) Complexes", Chemistry of Materials vol. 1, No. 3, pp. 348–352, 1989.

M. Vilas–Boas et al., "New Insights into the Structure and Properties of Electroactive Polymer Films Derived from [Ni(salen)]", Inorganic Chemistry, vol. 36, No. 22, pp. 4919–4929, 1997.

C.P. Horwitz and R.W. Murray, "Oxidative Electropolymerization of Metal Schiff–Base Complexes", bx;1Mol.Cryst.Liq.Cryst., vol. 160, pp. 389–404, 1988.

J.L. Reddinger and J.R. Reynolds, "Tunable Redox and Optical Properties Using Transition Metal–Complexed Polythiophenes", Macromolecules, vol. 30, No. 3 pp. 673–675, 1997.

J.L. Reddinger and J.R. Reynolds, "Electroactive π–Conjugated Polymers Based on Transition Metal–Containing Thiophenes Capable of Sensing Ionic and Neutral Species", ACS Polym. Prepr. pp. 321–222, 1997.

J.L. Reddinger and J.R. Reynolds, "Electroactive, π–Conjugated Polymers based on Transition Metal–Containing Thiophenes", Synthetic Metals 84, pp. 225–226, 1997.

P. Audebert et al., "Redox and Conducting Polymers Based on Salen–Type Metal Units; Electrochemical Study and Some Characteristics", New Journal of Chemistry, vol. 16, No. 6, pp. 697–703, 1992.

F. Bedioui et al., "Electrooxidative polymerization of cobalt, nickel and manganese salen complexes in acetonitrile solution", J. Electroanal. Chem. 301, pp. 267–274, 1991.

C.E. Dahm and D.G. Peters, "Catalytic Reduction of Iodoethane and 2–Iodopropane at Carbon Electrodes Coated with Anodically Polymerized Films of Nickel(II) Salen", Analytical Chemistry, vol. 66, No. 19, pp. 3117–3123, 1994.

K.A. Goldsby, "Symmetric and Unsymmetric Nickel(II) Schiff Base Complexes; Metal–Localized Versus LigandLocalized Oxidation", J.Coord.Chem., vol. 19, pp. 83–90, 1988.

H. Segawa et al., "Approaches to conducting polymer devices with nano–structure: Electrochemical construction of one–dimensional and two–dimensional prophyrin–oligothiophene co–polymers", Synthetic Metals 71, pp. 2151–2154, 1995.

T. Shimidzu et al., "Approaches to conducting polymer devices with nanostructures: photoelectrochemical function of one–dimensional and two–dimensional porphyrin polymers with oligothienyl molecular wire", Journal of Photochemistry and Photobiology A: Chemistry 99, Article 4168, pp. 1–7, 1995.

C. Armenguad et al., "Electrochemistry of conducting polypyrrole films containing cobalt porphyrin", J.Electroanal. Chem., 277, pp. 197–211, 1990.

(List continued on next page.)

*Primary Examiner*—Patricia A. Short
(74) *Attorney, Agent, or Firm*—Wolf, Greenfield & Sacks, P.C.

(57) ABSTRACT

Conductive properties are optimized in conducting polymers, made up of organic units and metal ions, by tailoring the position of metal ions with respect to conductive pathways or by selecting components such that the redox potential of organic units and metal ions differs by no more than 250 mV. Very small devices, and articles in which a high percentage of metal ions are redox active, are provided. Articles that can serve as sensors include metal ions with at least one free reactive site that can accommodate an analyte for conductivity change detection. Chemoresistive devices, field effect transistors, and signal amplifiers are provided.

17 Claims, 15 Drawing Sheets

OTHER PUBLICATIONS

P. Moisy et al., "Epoxidation of cis–cyclooctene by Molecular Oxygen Electrocatalysed by Polypyrrole–Manganese Porphyrin Film Modified Electodes", J. Electroanal. Chem. 250, pp. 191–199, 1988.

F. Bedioui et al., "Poly(Pyrrole–Manganese Tetraphenylporphyrin) film Electrodes in Acetonitrile Solution", J. Electroanal. Chem. 239, pp. 433–439, 1988.

A. Bettelheim et al., "Electochemical Polymerization of Amino–, Pyrrole–, and Hydroxy–Substituted Tetraphenylporphyrins", Inorganic Chemistry, vol. 26, No. 7, pp. 1009–1017, 1987.

P. Audebert et al., "Description of New Redox and Conducting Polymers Based on Copper Containing Units; Emphasis on the Role of Copper in the Electron Transfer Mechanism", Synthetic Metals 41–43, pp. 3049–3052, 1991.

S.S. Zhu et al., "Conducting Polymetallorotaxanes: A Supramolecular Approach to Transition Metal Ion Sensors", Journal of the American Chemical Society, vol. 118, No. 36, pp. 8713–8714, 1996.

S.S. Zhu and T.M. Swager, "Design of Conducting Redox Polymers: A Polythiophene–Ru(bipy)$_3^{\oplus}$ Hybrid Material**", Advanced Materials, vol. 8, No. 6, pp. 497–500, 1996.

G. Zotti et al., "Conductivity In Redox Modified Conducting Polymers. 2. Enhanced Redox Conductivity in Ferrocene-Substituted Polypyrroles and Polythiophenes", Chem. Mater. vol. 7, No. 12, pp.2309–2315 1995.

C.G. Cameron and P.G. Pickup, "A conjugated polymer/redox polymer hybrid with electronic communication between metal centres", Chem. Commun., pp. 303–304, 1997.

F. Bedioui et al., "Electrochemistry of conducting polypyrrole films containing cobalt porphyrin, Part 2." New Developments and inclusion of metallic aggregates in the coordination polymer, J. Electranal. Chem., vol. 297, pp. 257–269, 1991.

CONDUCTING POLYMER TRANSITION METAL HYBRID MATERIALS AND SENSORS

RELATED APPLICATION

This non-provisional application claims the benefit under Title 35, U.S.C. §119(e) of co-pending U.S. provisional application Ser. No. 60/067,200, filed Dec. 1, 1997, entitled "Conducting Polymer Transition Metal Hybrid Materials and Sensors" by Timothy M. Swager et al., incorporated herein by reference.

This invention was made with government support under Grant Numbers N00014-97-1-0520 and N00014-97-1-0174 awarded by the Department of the Navy. The government has certain rights in this invention.

FIELD OF THE INVENTION

The present invention relates to conducting polymers containing organic units and metal ions. These materials are useful in conducting or chemoresistive devices and in sensory devices.

BACKGROUND OF THE INVENTION

There have been many advances in solid state materials useful in conductive and chemoresistive devices and in sensory devices for determining the presence a variety of analytes. Tailoring the properties of these materials to effect a specific function or optimize performance is complex because properties can be dependant upon the overall architecture of the material, which often is unpredictable.

One class of solid state materials is conducting polymers. These polymers typically include organic structures possessing a degree of unsaturation to allow electronic communication throughout a polymeric structure. Because polymers in general are synthesized from monomer components, the design of the conducting properties of a conducting polymer can be facilitated by engineering the monomer component to a desired specificity. Moreover, polymers containing both organic and metal ion components afford a larger number of variables over organic-based polymers through the incorporation of a diverse number of metal ions. A variety of synthetic strategies are described in numerous prior art references.

Zotti et al. disclosed in situ conductivity of some polypyrroles and polythiophenes redox modified with pendant ferrocene groups. It was found that the electron hopping rate through the conductive polymer backbone is increased by a decrease of the ferrocene backbone distance and by conjugation of ferrocene with the backbone itself. Chem. Mater. 1995, 7, 2309.

Cameron et al. describes a benzimidazole-based conjugated polymer with coordinated $[Ru(bpy)_2]^{2+}$, moieties, providing direct electronic communication between the ruthenium complex and the polymer. Chem. Commun. 1997 303.

Audebert et al. reports a series of conducting polymers based on metal salen containing units based on mononuclear copper$^{II}$, cobalt$^{II}$, nickel$^{II}$ and zinc$^{II}$ complexes. Under carefully chosen conditions, thick electroactive polymer deposits are formed upon electrochemical oxidation of the monomer in solution. New. J. Chem. 1992, 16, 697.

Segawa et al. describes a series of highly ordered conducting polymers through the construction of sequentially ordered one- or two-dimensional metalloporphyrin polymers connected by oligothiophene bridges. The one-dimensional phosphorus(V)porphyrin polymers were linked toward the axial direction of the porphyrin ring whereas the two-dimensional metalloporphyrin polymers were linked equatorially by oligothienyl groups. Both polymer types were prepared by electrochemical polymerization techniques.

U.S. Pat. No. 5,549,851 discusses silicon containing polymers admixed with an amine compound. A highly conductive polymer composition is formed upon doping with an oxidizing dopant, typically iodine and ferric chloride. The composition has improved shapability and is easily applicable to form a highly conductive film or coating.

U.S. Pat. No. 4,839,112 discloses methods of fabricating low dimensionally electroconductive articles comprised of cofacially stacking organomacrocycles, preferably cofacially stacking phthalocyanines. The cofacially stacked composition in strong Bronsted acid is formed into a desired shape such as a fiber or film.

The integration of receptors into conducting polymer frameworks has been shown to produce materials which provide changes in physical characteristics upon binding of targeted analytes. Devynck et al. describes a material containing CO(III) porphyrin sites. Variations in the Co(III)/Co (II) redox couple are observed upon exposure to pyridine and with changing pyridine concentrations.

U.S. Pat. No. 5,250,439 reports the use of conductive sensors to determine the presence or concentration of a predetermined analyte in a test sample by measuring the change in conductivity of a layer of an organic conducting polymer. This conductivity change results from generating a dopant compound that migrates to the detection zone of the conductive sensor to dope the layer of conducting polymer. One example describes the dopant compound as comprising molecular iodine, formed in a reaction between iodide ions, a peroxidase enzyme or a molybdenum(VI) catalyst in the reaction zone of the device to determine the presence or concentration of glucose.

U.S. Pat. No. 4,992,244 discloses a chemical microsensor fabricated by using Langmuir-Blodgett techniques. The chemical microsensor is a film based on dithiolene transition metal complexes which display differing degrees of current changes upon exposure to a particular gas or vapor and its concentration.

Despite numerous advances in polymeric materials as chemoresistive and sensory devices, there remains a need to improve the conductivity level of these materials. Moreover, improvements in fabricating films of these materials, such that conductivity properties remain optimal at a desired film thickness, would be desirable. There also remains a need to produce sensory materials for a wider variety of analytes. Transition metals offer unique and desirable characteristics for the creation of sensory materials that are sensitive to anions as well as small molecules. In spite of this and other potential applications, few studies have been directed at the development of transition metal/conducting polymer hybrid systems.

SUMMARY OF THE INVENTION

The present invention provides a polymeric structure comprising a first component of a plurality of organic units and a second component comprising a plurality of metal ions. The polymeric structure may contain one or more conductive pathways, at least one conductive pathway comprising the first and second components and it least some of the metal ions of the second component positioned no more than three chemical bonds from any of the conductive pathways. Conductive properties are optimized by designing the first component such that the redox potential of the first component differs from that of the second component by no more than 250 mV. One illustrative embodiment of the present invention provides a polymeric structure with a conductivity of at least $10^{-4}$ S·cm$^{-1}$.

Another aspect of the invention provides an article comprising a three-dimensional polymeric structure including a first component comprising a plurality of organic units and a second component comprising a plurality of metal ions. At least one portion of the article has a minimum dimension of at least about 250 Å, the structure. The polymeric structure may contain one or more conductive pathways, at least one conductive pathway comprising the first and second components and at least some of the metal ions of the second component positioned no more than three chemical bonds from any of the conductive pathways. In another embodiment of the present invention, at least 20% of the metal ions in the array are redox active.

In a further aspect of the invention, a polymeric structure is provided including a first component comprising a plurality of organic units and a second component comprising a plurality of metal ions. At least one conductive pathway comprises the first and second components wherein at least some of the metal ions of the second component are located no more than three chemical bonds from any conductive pathway. Each metal ion includes at least one free coordination site, whereupon binding of an analyte on at least 1% of the free coordination sites results in a conductivity change through the polymeric structure of at least 1%. In another illustrative embodiment of the present invention, the polymer comprises the structure:

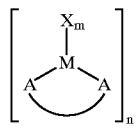

wherein M is a metal ion and

denotes an organic unit.

In another illustrative embodiment of the present invention, the polymer comprises the structure:

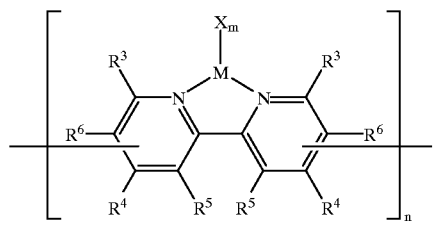

In another illustrative embodiment of the present invention, the polymer comprises the structure:

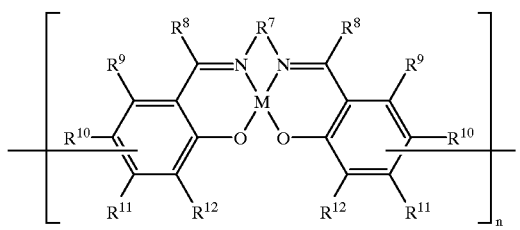

In a further aspect of the invention, a monomer is provided comprising a first component and a second component, wherein the first component is an organic structure and the second component is at least one metal ion. The monomer further comprises at least two functional groups situated on the first component thereby allowing the monomer units to be covalently linked to form a polymeric structure. The polymeric structure includes at least one conductive pathway comprising the first and second components, the second component located no more than three chemical bonds from any conductive pathway. Conductive properties are optimized by designing the first component such that the redox potential of the first component differs from that of the second component by no more than about 250 mV.

In a further aspect of the invention, a chemoresistive device is provided comprising a polymeric structure, a first electrode connected to a first portion of the polymeric structure and a second electrode connected to a second portion of the polymeric structure. The first electrode is connected to the second electrode by an electrical circuit external of the polymeric structure. The electrical circuit includes a source of electric potential. The polymeric structure includes a first component comprising a plurality of organic units and a second component comprising a plurality of metal ions. At least one conductive pathway comprises the first and second components wherein at least some of the metal ions of the second component are located no more than three chemical bonds from any conductive pathway. Conductive properties are optimized by designing the first component such that the redox potential of the first component differs from that of the second component by no more than about 250 mV.

In another embodiment of the invention, a field effect transistor is provided comprising a polymeric structure comprising a plurality of organic units, a plurality of metal ions, and a plurality of electrically-conductive pathways each including a plurality of the organic units and a plurality of the metal ions, at least some of the metal ions located within three chemical bonds from a conductive pathway, wherein the redox potentials of the first and second components in the polymeric structure differ by no more than about 250 mV in which the polymeric structure contacts an insulating substrate. A first electrode is connected to a first portion of the polymeric structure and a second electrode is connected to a second portion of the polymeric structure, each electrode contacting a surface of the insulating substrate, the first electrode being connected to the second electrode by an electrical circuit external of the polymeric structure. A gate electrode connected to a voltage source is separated from the polymeric structure by an insulating medium and is positioned to effect field effect response.

In a further embodiment of the invention a method for signal amplification is provided. The method involves applying an electrical potential between a first electrode and second electrode and determining a current flow between the first electrode and the second electrode trough a polymeric structure at a voltage. The polymeric structure comprises a plurality of organic units, a plurality of metal ions, and a plurality of electrically-conductive pathways each including a plurality of the organic units and a plurality of the metal ions. At least some of the metal ions are located within three chemical bonds from a conductive pathway comprising the plurality of organic units and metal ions, wherein the redox potentials of the first and second components in the polymeric structure differ by no more than about 250 mV. The conductivity of the polymeric structure between the first electrode and the second electrode is altered producing a change in the current flow and/or the voltage.

In a further aspect of the invention, an analyte sensor is provided comprising a polymeric structure, a first electrode connected to a first portion of the polymeric structure and a second electrode connected to a second portion of the polymeric structure, the first electrode connected to the second electrode by an electrical circuit external of the polymeric structure, a source of electric potential in the electrical circuit and a two-point conductivity probe (or generic measuring device). The polymeric structure includes a first component comprising a plurality of organic units and a second component comprising a plurality of metal ions. At least one conductive pathway comprises the first and second components wherein at least some of the metal ions of the second component are located no more than three chemical bonds from any conductive pathway. Each metal ion includes at least one free coordination site, whereupon binding of an analyte on at least 1% of the free coordination sites results in a conductivity change through the polymeric structure of at least 1%. The analytes can be gases, Lewis bases or conjugate bases of medium level to strong Bronsted acids.

In a further aspect of the invention, a method for analyzing the presence of at least one analyte is disclosed. The method comprises exposing a medium suspected of containing an analyte to a polymeric structure comprising a plurality of organic units, a plurality of metal ions, and a plurality of electrically-conductive pathways. At least one electrically-conductive pathway includes a plurality of the organic units and a plurality of the metal ions and at least some of the metal ions located within three chemical bonds from a conductive pathway. At least some of the metal ions include at least one free coordination site each. Binding of an analyte on at least 1% of the free coordination sites results in a conductivity change of at least 1% in the polymeric structure and at least one analyte is determined by determining a change in conductivity of the polymeric structure subsequent to the exposing step.

Other advantages, novel features, and objects of the invention will become apparent from the following detailed description of the invention when considered in conjunction with the accompanying drawings, which are schematic and which are not intended to be drawn to scale.

DETAILED DESCRIPTION OF THE INVENTION

Figure 1:
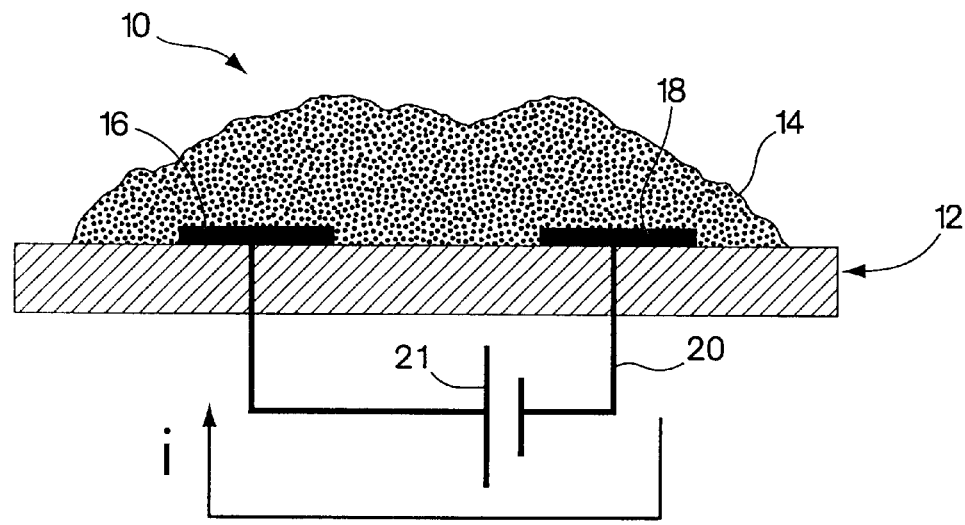
FIG. 1 is an illustration of a chemoresistive device including a polymeric structure of the invention.

The present invention involves creation of optimal polymeric conducting systems that actively utilize a transition metal's redox properties and rely on extensive mixing of metal centered electronic states with those of an organic polymer. By making systematic comparisons between these materials, the relative contribution of the organic polymer and the metal centered redox processes to the conductivity can be determined.

In one aspect, the present invention provides a polymeric structure having a first component comprising a plurality of organic units and a second component comprising a plurality of metal ions. In preferred embodiments the plurality of organic units are covalently linked to form a continuous organic backbone in the polymeric structure. The organic units preferably include multiply unsaturated units in electronic communication with each other. Electronic communication herein refers to a means of delocalizing electron density through a conjugated $\pi$ system. One embodiment of the present invention provides a polymeric structure comprising a organic backbone providing electronic communication throughout the polymeric structure. The second component, the plurality of metal ions, coordinate to the organic units in the standard fashion of metal-organic bonding. Preferred metal ions contain at least d orbitals permitting electronic communication with the organic units. These metal ions include, for example, transition metal ions, lanthanides and actinides.

The polymeric structure includes at least one conductive pathway comprising the first and second components. While the polymeric structure can include conductive pathways defined only by organic units forming a continuous organic backbone, it also includes at least one conductive pathway comprising at least some of the metal ions. That is, at least one conductive pathway passes through at least some metal ions and organic units such that the metal ions in the conductive pathway are in electronic communication with the organic units.

In one embodiment, at least some of the metal ions, preferably a majority and more preferably all, are located no more than three chemical bonds from any conductive pathway. "Located no more than three chemical bonds from any conductive pathway" means that there is no other chemical bond pathway between the metal ions and the atoms in the conductive pathway except through at least three successive covalent bonds. A metal ions triply bonded to another atom defines a distance of one chemical bond according to this definition. This provides a polymeric structure that does not include metal ions that are substantially electronically isolated from the organic units such that conductivity is based solely upon electron hopping between metal ions.

In another embodiment the redox potentials of the first and second components in the polymeric structure differ by no more than about 250 mV. The term "redox potential" herein refers to an electrochemical potential required to effect an reduction or oxidation process at a redox active center. Reduction or oxidation processes involve the transfer of an electron to or from the redox active center, respectively. The term "redox potential" herein also refers to the electrochemical potential required to achieve maximum current of either a reduction or oxidation process at a redox active center. Redox potentials can be obtained by a cyclic voltammetry experiment using methods known to those of ordinary skill in the art. The process of minimizing the difference of redox potentials between the first and second component is herein referred to as "redox matching". In essence, redox matching provides optimal mixing of electronic states of the first component with electronic states of the second component, thus enhancing the conductivity along a conductive pathway comprising the first and second components by enhancing the electronic communication between the first and second components. In the present invention the redox potentials of the first and second components in the polymeric structure differ by no more than about 250 mV, preferably by no more than about 200 mV, more preferably by no more than about 150 mV, more preferably by no more than about 100 mV, more preferably still by no more than about 0 mV or as well as one of ordinary skill in the art can resolve the respective redox potentials.

In another embodiment, the conductivity of the polymeric structure along the at least one conductive pathway is measured by an in situ two-point probe conductivity apparatus. By using this apparatus, the conductivity of the polymeric structure of the present invention is at least $10^{-4}$ $S \cdot cm^{-1}$.

Another aspect of the invention provides an article comprising a three-dimensional polymeric structure including at least one portion having a minimum dimension of at least about 250 Å. The polymeric structure includes a first component comprising a plurality of organic units and a second component comprising a plurality of metal ions and at least one conductive pathway comprising the first and second components with at least some of the metal ions in the second component located no more than three chemical bonds from any conductive pathway. In a further embodiment at least 20% of the metal ions in the array are redox active. Preferably, at least 30% of the metal ions in the array are redox active. More preferably at least 50% of the metal ions in the array are redox active. More preferably at least 75% of the metal ions in the array are redox active. More preferably still, at least 100% of the metal ions in the array are redox active. Moreover, in this embodiment the metal ions in the array are redox active without the aid of an electron transfer mediator.

In another aspect of the invention, a polymeric structure is provided including a first component comprising a plurality of organic units and a second component comprising a plurality of metal ions, at least one conductive pathway comprising the first and second components and at least some of the metal ions of the second component located no more than three chemical bonds from any conductive pathway. Each metal ion includes at least one free coordination site allowing binding of an analyte. A free coordination site includes sites on a metal ion that are bound by weak Lewis bases such as a solvent ion that are easily displaced by exposure to an analyte. Binding of analytes on at least 1% of the free coordination sites results in a conductivity change through the polymeric structure of at least 1%.

In another aspect, the invention relates to the synthesis of a polymeric structure having a first component comprising a plurality of organic units and a second component comprising a plurality of metal ions, the polymeric structure having a formula:

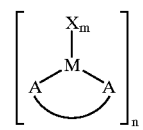

wherein

is an organic unit and M is a metal ion. The organic unit

comprises a covalently linked organic structure in which A represent atoms capable of bonding to a metal ion. The value "n" denotes a number of monomer units, n being at least 3, in that the the polymeric structure comprising linkages through at least one atom in

In one embodiment of the invention, the polymeric structure is an array of n monomer units extending along one dimension. In another embodiment of the invention, the polymeric structure is an array of n monomer units extending along two dimensions.

and X are selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy, hydroxyl, hydroxyalkyl, amino, alkylamnino, dialkylainino, arylamino, diarylamino, —NR$^1$COR$^2$, thioalkyl, thioaryl, —SO$_2$R$^1$, —SOR$^1$, —SO$_2$OR$^1$, F, Cl, Br, and I, and n=0–3. R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I. The value "m"=0–3.

In another embodiment, the polymer comprises the formula:

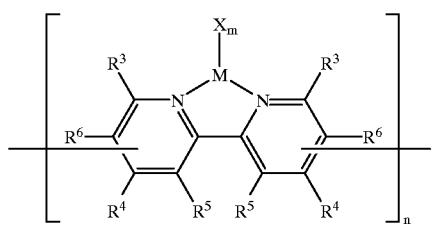

wherein M is a metal ion. The value "n" denotes a number of monomer units, n being at least 3, in that the the polymeric structure comprising linkages through at least one of R$^3$–R$^6$ or X. In one embodiment of the invention, the polymeric structure is an array of n monomer units extending along one dimension. In another embodiment of the invention, the polymeric structure is an array of n monomer units extending along two dimensions. In another embodiment of the invention, the polymeric structure is an array of n monomer units extending along three dimensions. R$^3$–R$^6$ can be the same or different, and each is selected from the group consisting of hydrogen, C$_1$–C$_{10}$ alkyl, C$_1$–C$_{10}$ heteroalkyl, aryl, heteroaryl, carbonyl, acyl, acyloxy, —CHO, —COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, I, or where possible, any two R groups combining to form a fused benzene group. R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I. X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, alkyloxy, aryloxy, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I, and n=0–3. R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I. The value "m"=0–3. In a preferred embodiment R$^3$ or R$^6$ has the structure:

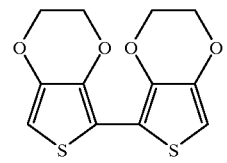

In a preferred embodiment, X has the formula:

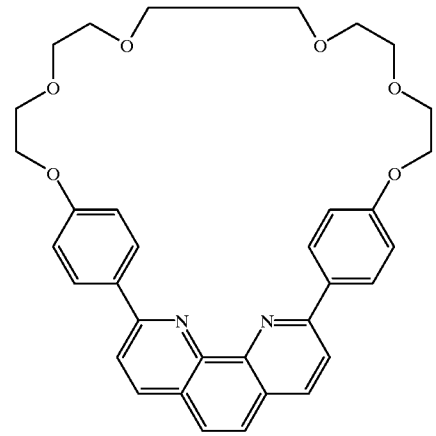

In another embodiment, the polymeric structure has the formula:

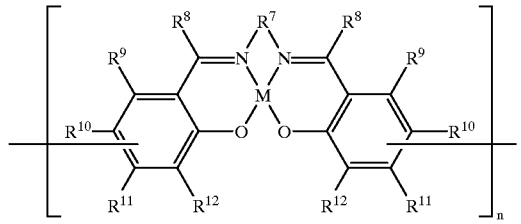

wherein M is a metal ion. The value "n" denotes a number of monomer units, n being at least 3, in that the the polymeric structure comprising linkages through at least one of R$^7$–R$^{12}$. In one embodiment of the invention, the polymeric structure is an array of n monomer units extending along one dimension. In another embodiment of the invention, the polymeric structure is an array of n monomer units extending along two dimensions. In another embodiment of the invention, the polymeric structure is an array of n monomer units extending along three dimensions. R$^7$–R$^{13}$ can be the same or different, and each is selected from the group consisting of hydrogen, C$_1$–C$_{10}$ alkyl, C$_1$–C$_{10}$ heteroalkyl, aryl, heteroaryl, carbonyl, acyl, acyloxy, —CHO, —COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I. Where possible, any two R groups can combine to form a ring srtucture. R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I.

In a preferred embodiment of the invention, R$^{10}$ has the structure:

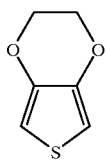

In another embodiment, the polymeric structure has the formula:

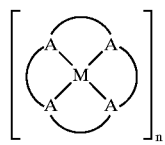

wherein M is a metal ion, n denotes a number of monomer units, n being at least 3, the polymeric structure comprising linkages through at least one atom in

In one embodiment of the invention, the polymeric structure is an array of n monomer units extending along one dimension. In another embodiment of the invention, the polymeric structure is an array of n monomer units extending along two dimensions. In another embodiment of the invention, the polymeric structure is an array of n monomer units extending along three dimensions. Any

unit or X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy, hydroxyl, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I; R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I, and m=0–2. In one embodiment of the invention, the four

units constitute a macrocycle. In another embodiment of the invention the macrocycle is selected from the group consisting of cyclams, phthalocyanines and porphyrins.

In a preferred embodiment of the invention the metal ion is a transition metal ion. Transition metal ions contain 3d orbitals that can form a π bond with a p orbital of the organic unit involved in a conjugated π system such that the transition metal ion comprises a part of the conjugated π system. Preferably, the 3d orbitals are not completely filled, providing a mechanism to delocalize electron density. In another preferred embodiment of the present invention, redox matching involves monitoring the redox couples of Co(II/III) and Cu(I/II).

In another aspect of the invention, a monomer unit is provided. The monomer comprises a first component and a second component, wherein the first component is an organic structure and the second component is at least one metal ion. At least two functional groups are situated on the first component allowing the monomer units to be covalently linked to form a polymeric structure. The units can be covalently linked by redox or chemical means. In a preferred embodiment of the invention, the functional group includes a thiophene. In another preferred embodiment of the invention, the functional group includes the structures:

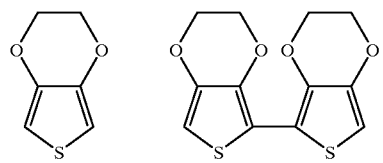

The resultant polymer contains at least one conductive pathway comprising the first and second components. The second component located no more than three chemical bonds from any conductive pathway. The redox potentials of the first and second components in the polymeric structure differ by no more than about 250 mV, preferably by no more than about 200 mV, more preferably by no more than about 150 mV, more preferably by no more than about 100 mV, more preferably still by no more than about 0 mV or as well as one of ordinary skill in the art can resolve the respective redox potentials.

In another embodiment of the invention, a polymer film is formed by redox polymerization involving either oxidative or anodic polymerization. Redox polymerization herein refers to a catalytic polymerization process that occurs upon subjecting the monomer to an oxidant or a reductant. In a preferred embodiment redox polymerization comprises subjecting the monomer oxidative or reductive potential at an electrode such that oxidation or reduction occurs electrolytically. In another embodiment, the monomers are linked together by chemical coupling methods. In one embodiment, the chemical coupling comprises linking the organic units to each other with chemical coupling agents using means known to those of ordinary skill in the art.

In accordance with the invention, the following screening test can be used to determine whether a polymeric structure comprised of a first component and a second component will provide at least one conducting pathway comprising the first and second component. First, a polymer and a monomer are provided. The polymer contains a continuous backbone of a plurality of organic units free of any metal ions. The monomer is a preassembled metal complex having an organic portion and at least one metal center. The organic portion of the monomer structurally mimics the repeating unit of the polymer. The next step involves measuring the redox potentials of the monomer and the polymer. The difference between these values is then calculated and compared with a desired value. A preferred value is no more than about 250 mV, preferably by no more than about 200 mV, more preferably by no more than about 150 mV, more preferably by no more than about 100 mV, more preferably still by no more than about 0 mV or as well as one of ordinary skill in the art can resolve the respective redox potentials. Thus the screening test is a method for determining whether the polymer and the metal ion are redox matched.

Another aspect of the invention provides a chemoresistive device. Referring to FIG. 1, a chemoresistive device 10 comprises an insulating substrate 12 and polymeric structure 14 positioned on the insulating substrate 12, wherein polymeric structure 14 comprises a plurality of organic units, a plurality of metal ions, and a plurality of electrically-conductive pathways, at least one electrically-conductive pathway including a plurality of the organic units and a plurality of the metal ions, and at least some of the metal ions located within three chemical bonds from a conductive pathway. The redox potentials of the first and second components in the polymeric structure differ by no more than about 250 mV. A first electrode 16 is electrically connected to a first portion of the polymeric structure and a second electrode 18 is connected to a second portion of the polymeric structure. First electrode 16 is also connected to second electrode 18 by an electrical circuit 20 external of the polymeric structure. A source of electric potential 21 in the electrical circuit generates is provided. Device 10 can be a sensor, having chemically sensitive conductivity. Polymeric structure 14 in this embodiment can includes metal ions with sites of unsaturation that can be coordinated by an analyte, changing conductivity of structure 14 measurably. An ammeter or voltmeter (not shown) can be provided for detection.

Figure 2:
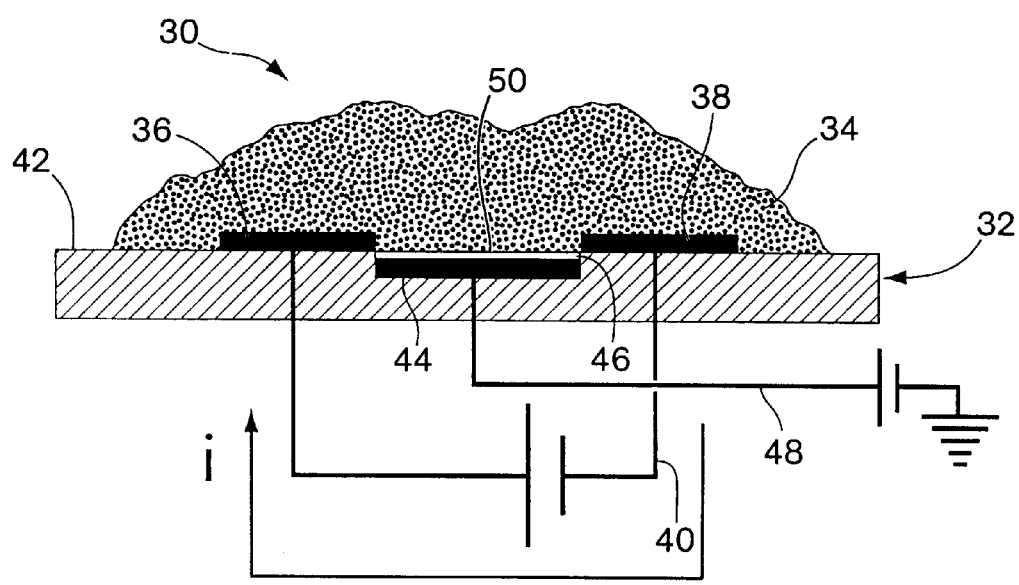
FIG. 2 is an illustration of a field effect transistor including a polymeric structure of the invention.

In another embodiment of the invention, a field effect transistor is described. Referring to FIG. 2, a field effect transistor 30 comprises an insulating substrate 32. A polymeric structure 34 contacts the insulating substrate 32. The polymeric structure can be defined by various embodiments described herein. Polymeric structure 14 can include a plurality of organic units, a plurality of metal ions, and a plurality of electrically-conductive pathways. At least one electrically-conductive pathway includes a plurality of the organic units and a plurality of the metal ions, and at least some of the metal ions are located within three chemical bonds from a conductive pathway, wherein the redox potentials of the first and second components in the polymeric structure differ by no more than about 250 mV. The field effect transistor includes a first electrode 36 connected to a first portion of the polymeric structure and a second electrode 38 connected to a second portion of the polymeric structure. The first electrode 36 is connected to the second electrode 38 by an electrical circuit 40 external of the polymeric structure. Each electrode can be in contact with a surface of the insulating substrate 42. A gate electrode 44 contacts a portion 46 below a surface of the insulating substrate contacting the polymeric structure. In a futher embodiment, the first electrode 36 is a source electrode and the second electrode 38 is a drain electrode. Applying a voltage 48 to the gate electrode 44 results in the formation of a capacitor between the gate electrode 44 and a portion of the polymeric structure.

Figure 3:
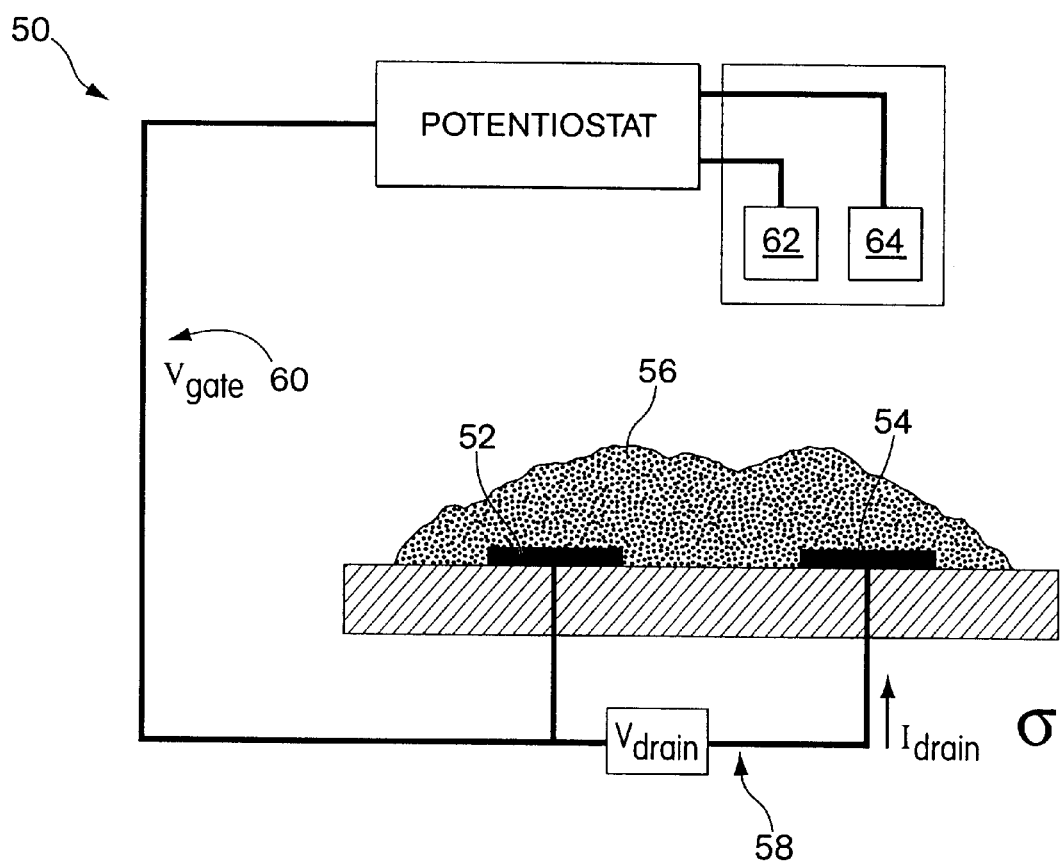
FIG. 3 is an illustration of a microelectrochemical transistor including a polymeric structure of the invention.
Figure 4A:
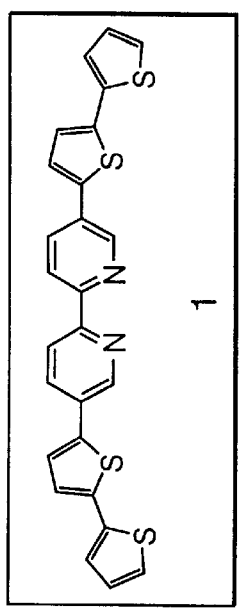
FIG. 4 is a schematic depiction of the synthesis of 5,5-Bis(5-bi(2,2'-thienyl))-2,2'-bipyridine(1), 5,5'-Bis(3,4-ethylenedioxythienyl)-2,2'-bipyridine(3), and 5,5'-Bis(5-(2, 2'-bi(3,4-ethylenedioxythienyl))-2,2'-bipyridine(2)
Figure 4A:
Figure 4B:
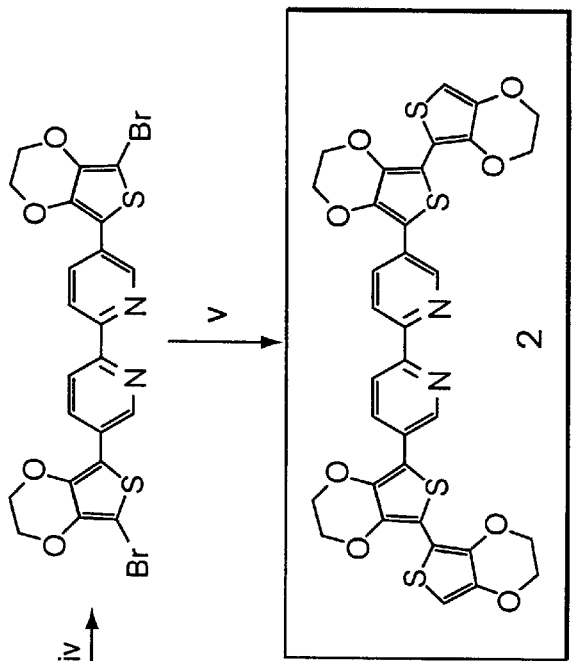
Figure 4B:
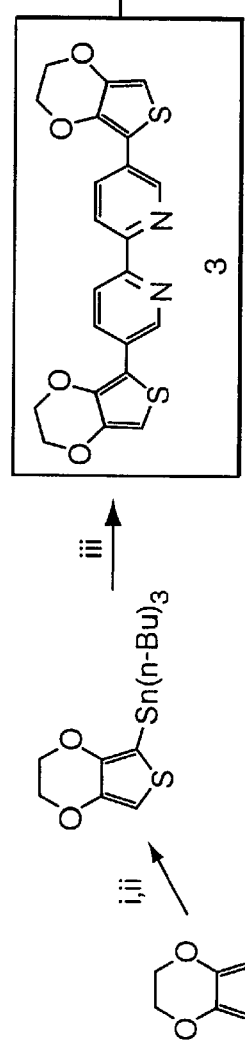

Referring now to FIG. 3, a microelectrochemical transistor 50 is shown, including a first electrode 52 and a second electrode 54, each in electrical contact with polymeric structure 56. Electrodes 52 and 54 are connected by an external drain circuit 58, which defines a portion of a gate circuit 60 including a counter electrode 62 and a reference electrode 64. By contacting counter and reference electrodes 62 and 64 with an electrolyte that also contacts polymeric structure 56, the transistor can be made to operate. Modification of voltage across the gate circuit can be made to affect conductivity of structure 56, which in turn affects current in the drain circuit when a constant voltage is applies between electrodes 52 and 54. This device defines a sensor when the redox state of structure 56, at a given gate voltage, is dependent on the presence or concentration of an analyte in a medium exposed to structure 56.

EXAMPLE 1

5-(Tributylstannyl)-2,2-bithiophene

The synthesis described herein is depicted schematically in FIG. 4. 1.0 g (6 mmol) of bithiophene in 30 ml THF was treated dropwise with 3.54 ml (6 mmol) of 1.70 M n-butyllithium and stiffed for 0.5 h at −78° C. under $N_2$ atmosphere. 1.96 ml of tributylstannyl chloride (7.2 mmol) was then added to the solution. After stirring at room temperature for 6 h, the solvent was evaporated and the residue was dissolved in 20 ml of hexane and filtered. The filtrate was evaporated to produce 3.4 g of crude 5-(tributylstannyl)-2,2-bithiophene as a light yellow liquid for the next step reaction. $^1$H NMR: (250 MHZ, $CDCl_3$): d (ppm) 7.27 (d, 1H), 7.15 (2d, 2H), 7.03 (d, 1H), 6.98 (t, 1H), 1.54 (m, 6H), 1.31 (m, 6H), 1.10 (t, 6H), 0.89 (m, 9H). $^{13}$C NMR (125 MHZ, $CDCl_3$): d (ppm) 136.28, 127.98, 127.94, 125.19, 124.56, 124.17, 123.97, 123.66, 29.10, 27.50, 13.91, 11.11. MS (FAB): ($M^+$) found: 456, calcd for $C_{20}H_{32}S_2Sn$: 455.28.

EXAMPLE 2

5,5-Bis(5-bi(2,2'-thienyl))-2,2'-bipyridine (1)

The synthesis described herein is depicted schematically in FIG. 4. 0.3 g (1.1 mmol) of 5-(tributylstannyl)-2,2-bithiophene, 0.1 g (0.3 mmol) of 5,5'-dibromo-2,2'-bipyridine, and 0.014 g (5%) of trans-dichlorobis (triphenylphosphine)palladium (II) catalyst were mixed in 40 ml DMF and heated at 80°–90° C. overnight under argon. After removal of the DMF under vacuum, the resulting solid was chromatographed (silica gel, $CH_2Cl_2$) to give a yellow compound in 60% yield. For large scale reactions, recrystallization is suggested. $^1$H NMR: (250 MHZ, $CDCl_3$): d (ppm) 8.92 (d, 2H), 8.42 (d, 2H), 7.98 (dd, 2H), 7.35 (d, 2H), 7.19 (m, 4H), 7.04 (t, 4H). The extremely poor solubility of this compound prevented characterization by $^{13}$C NMR. MS (FAB): found ($M^+$): 485.0268, calcd 485.0274. Anal. Calcd for $C_{26}H_{16}N_2S_4$: C, 64.46; H, 3.33; N, 5.79. Found: C, 63.88; H. 3.43; N 5.49. MP (under argon): 259° C., (dec).

EXAMPLE 3

2-(Tributylstannyl)-3,4-ethylenedioxythiophene

The synthesis described herein is depicted schematically in FIG. 4. 2.0 g (14 mmol) of 3,4-ethylenedioxythiophene in 150 ml dry THF was treated dropwise with 10 ml (16.2 mmol) of 1.6 M n-butyl lithium at −78° C. under argon. After stirring for 0.5 h and warming to −40° C., 5.95 g (18.8 mmol) tributylstannyl chloride was added to the solution and it was warmed to room temperature. The solvent was removed by rotary evaporation after stirring for 8 h. The residue was dissolved in hexanes and filtered. The filtrate was dried in vacuum to afford 6.0 g 2-(tributylstannyl)-3,4-ethylenedioxythiophene as a yellow liquid. The compound was used for next step reaction as obtained, no further purifications. $^1$H NMR (250 MHZ, $CDCl_3$): d (ppm) 6.56 (s, 1H); 4.16 (s, 4H); 1.61–1.49 (m, 6H); 1.39–1.22 (m, 6H); 1.09 (t, 9H); 0.90 (q, 6H). $^{13}$C NMR (125 MHZ, $CDCl_3$): d (ppm) 147.88, 142.65, 109.08, 105.99, 64.86, 64.80, 29.08, 27.40, 13.79, 10.71. $(M+H)^+$ found: 431, caled for $C_{18}H_{32}O_2SSn$: 430.11

EXAMPLE 4

5,5'-Bis(3,4-ethylenedioxythienyl)-2,2'-bipyridine (3)

The synthesis described herein is depicted schematically in FIG. 4. 0.1 g (0. 16 mmol) of 5,5'-dibromo-2,2'- bipyridine, 0.4 g of (0.5 mmol) 2-(tributylstannyl)-3,4-ethylenedioxythiene, and 0.022 g (5%) of trans-dichlorobis(triphenylphosphine)palladium (II) catalyst were mixed in 50 ml of dry DMF and heated to 110° C. for 6 h under argon. After removal of the DMF under vacuumn, the residue was purified by column chromatography (2% MeOH/$CH_2Cl_2$) to generate 0.14 g of a yellow solid. Yield: 95%. $^1$H NMR (250 MHZ, DMSO-$d_6$): d (ppm) 8.96 (s, 2H); 8.39 (d, 2H, J=10 Hz); 8.14 (d, 2H, J=7.5 Hz); 6.79 (s, 2H); 4.39 (s, 4H), 4.29 (s, 4H). $^{13}$C NMR (125 MHZ, DMSO-$d_6$): d (ppm) 162,26, 155.35, 152.10, 149.79, 143.0, 142.86, 138.93, 130.12, 109.72, 74.82, 73.94. MP (under argon): 228–229 ûC. MS (FAB): $(M+H)^+$ found: 437.063, calcd for $C_{22}H_{16}N_2O_4S_2$: 436.055.

EXAMPLE 5

5,5'-Bis(2-(5-bromo-3,4-ethylenedioxythienyl))-2,2'-bipyridine

The synthesis described herein is depicted schematically in FIG. 4. 70 mg (0.16 mmol) of 5,5'-bis(3,4-ethylenedioxythienyl)-2,2'-bipyridine was suspended in 10 ml of DMF and stirred for ten minutes under reduced-lighting conditions. To the solution was added 57 mg (0.32 mmol) of NBS. Stirring overnight at room temperature resulted in the precipitation of a yellow solid from the solution, which was collected by filtering and washing with a small amount of acetone. Drying the yellow solid under vacuum provided 70 mg of 5,5'-bis(2-(5-bromo-3,4-ethylenedioxythienyl))-2,2'-bipyridine. Yield: 74%. $^1$H NMR (250 MHZ, DMSO-$d_6$): d (ppm) 8.92 (s, 2H); 8.39 (d, 2H, J=10 Hz); 8.13 (d, 2H, J=7.5 Hz); 4.41 (m, 8H). The poor solubility of this compound precluded obtaining a $^{13}$C NMR on this compound. MS (FAB): $(M^+)$ found: 595, calcd for $C_{34}H_{24}N_2O_8S_4$: 594.29. MP (under argon): 260° C., (dec).

EXAMPLE 6

5,5'-Bis(5-(2,2'-bi(3,4-ethylenedioxythienyl)-2,2'-bipyridine (2)

The synthesis described herein is depicted schematically in FIG. 4. 35 mg (0.06 mmol) of 5,5'-bis(5-(3,4-ethylenedioxythienyl)bromide)-2,2'-bipyridine, 100 mg (0.24 mmol) of 2-(tributylstannyl)-3,4-ethylenedioxythiophene, and 7 mg (10%) of tetrakis(triphenylphosphine)palladium(0) were refluxed in 30 ml of dry DMF for 6 h under argon. The solvent was removed under vacuum. The resulting red solid was dissolved in $CH_2Cl_2$ and filtered under argon. The filtrate's volume was reduced to approximately 5 ml, and the brown-yellow product precipitated upon the addition of hexanes to the $CH_2Cl_2$ solution. The compound was collected and dried to afford 23 mg of 5,5'-bis(5-(2,2'-bi(3,4-ethylenedioxythienyl))-2,2'-bipyridine (2) as a brownish-yellow solid. Yield: 54%. $^1$H NMR (250 MHZ, DMSO-$d_6$): d (ppm) 8.98 (s, 2H); 8.39 (d, 2H); 8.13 (d, 2H); 6.66 (s, 2H); 4.45–4.27 (b, 16H). The poor solubility of this compound prevented characterization by $^{13}$C NMR. MS (FAB): found $(M+H^+)$ 717.0494, calcd for $C_{34}H_{24}N_2O_8S_4$: 716.0417. MP (under argon):>260° C.

EXAMPLE 7

Rot(1,Zn)($ClO_4$)$_2$

Figure 5:
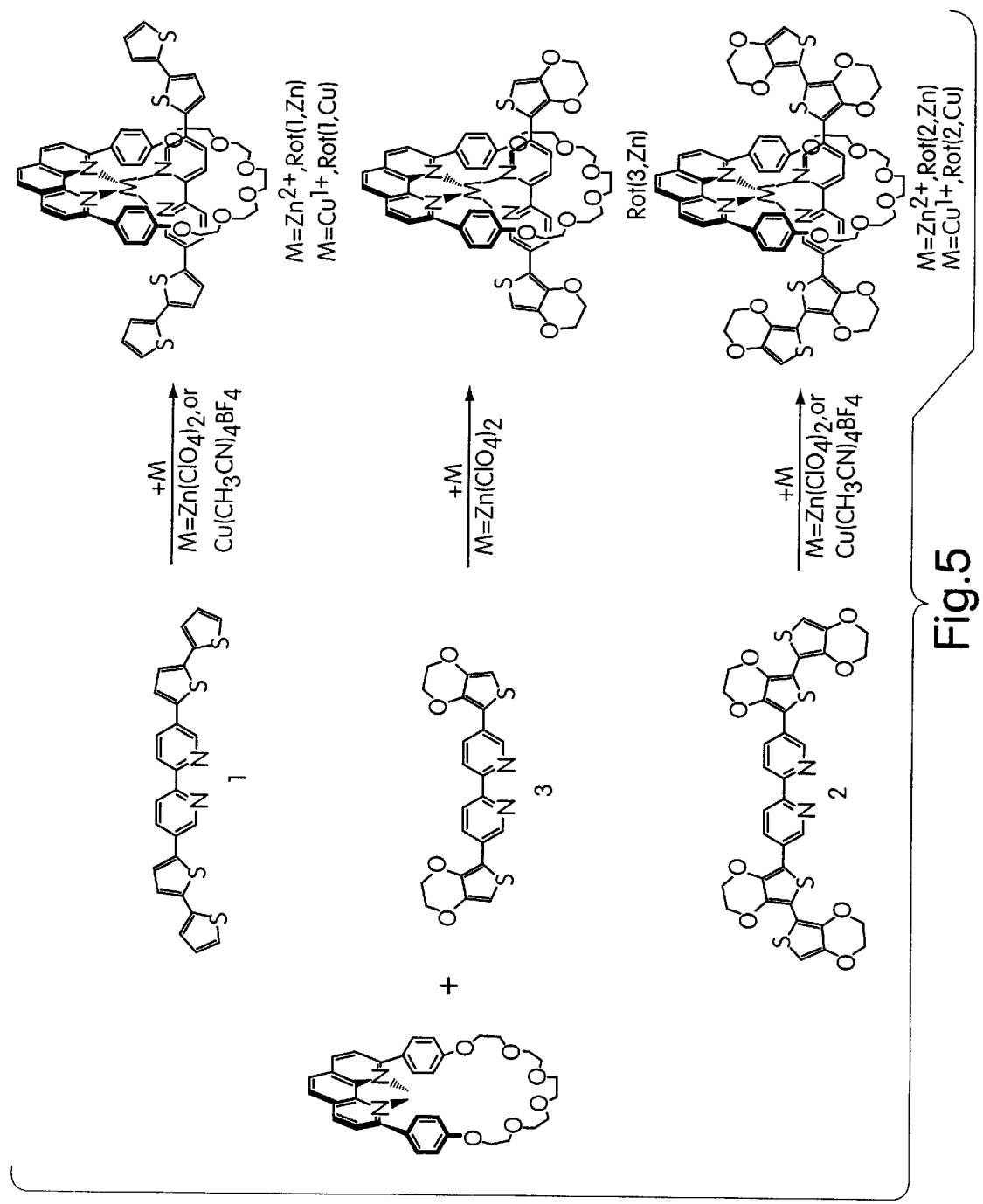
FIG. 5 is a schematic depiction of the synthesis of Rot(1,Zn), Rot(1,Cu), Rot(3,Zn), Rot(2,Zn), and Rot(3,Cu)

The synthesis described herein is depicted schematically in FIG. 5. A 25 ml $CH_2Cl_2$ solution containing 0.05 g of the macrocyclic phenanthroline and 0.042 g of 1 was added to 0.033 g of Zn($ClO_4$)$_2$·$xH_2O$ in 3 ml of $CH_3CN$, and the mixture was stirred for 2 h at room temperature. After filtering, the solvent was removed, and the residue was dissolved in 20 ml acetone, and filtered. Diethyl ether was added to the red-orange filtrate to precipitate a red-orange solid at 0° C. Yield: 71%. $^1$H NMR (500 MHZ, Acetone-$d_6$): d (ppm) 9.23 (d, 2H, J=8.5 Hz); 8.70 (s, 4H); 8.61 (s, 2H); 8.53(s, 2H); 8.49(d, 2H, J=8.5 Hz); 7.685 (d, 4H, J=2 Hz); 7.66 (m, 2H); 7.55 (dd, 2H, J=4.5 Hz, J=1); 7.40 (d, 4H, J=4 Hz); 7.15 (m, 2H); 6.63 (d, 4H, J=8.5 Hz); 3.94 (t, 4H, J=4.5 Hz); 3.88 (m, 8H); 3.79 (t, 4H, J=4 Hz); 3.75 (t, 4H, J=4 Hz). $^{13}$C NMR (125 MHZ, CDCl$_3$): d (ppm) 160.05, 159.0, 145.5, 145.0, 141.8, 141.25, 141.24, 140.0, 137.5, 136.47, 135.5, 132.01, 129.34, 128.66, 128.11, 127.02, 125.79, 125.58, 124.92, 124.79, 122.57, 115.04, 115.0, 70.87, 70.71, 70.5, 69.34, 68.41. Anal. Calcd for $C_{60}H_{50}N_4O_{14}Cl_2S_4Zn$: C, 54.87; H, 3.84; N, 4.27. Found: C, 54.43; H, 4.17; N, 3.49. MP (under argon) >260° C.

EXAMPLE 8

Rot(1,Cu)(BF$_4$)

The synthesis described herein is depicted schematically in FIG. 5. This compound was synthesized by the same method as Rot(1,Zn)(ClO$_4$)$_2$ in 70% yield as a greenish-black solid. $^1$H NMR (250 MHZ, Acetone-$d_6$): d (ppm) 9.37 (d, 2H), 8.89–8,78 (m, 10H); 8.11 (d, 4H); 8.00 (d, 2H); 7.93 (d, 2H); 7.79 (d, 4H); 7.57 (t, 2H), 6.83 (d, 4H); 4.27 (m, 20H). $^{13}$C NMR (125 MHZ, Acetone-$d_6$): d (ppm): 160.64, 158.83, 150.44, 145.89, 144.83, 143.18, 138.63, 137.36, 134.56, 132.32, 130.45, 129.28, 127.95, 127.39, 126.68, 126.06, 125.58, 125.56, 123.70, 117.0, 116.90, 114.79, 114.77, 71.75, 71.63, 71.55, 70.28, 69.12. Anal. Calcd for $C_{60}H_{50}N_4O_6S_4BF4Cu$: C, 59.99; H, 4.20; N, 4.67. Found: 59.92; H, 4.41; N, 4.14. MP (under argon): 163° C., (dec).

EXAMPLE 9

Rot(3,Zn)(ClO$_4$)$_2$

The synthesis described herein is depicted schematically in FIG. 5. This compound was synthesized by the same method as Rot(1,Zn)(ClO$_4$)$_2$ in 60% yield as a yellow solid. $^1$H NMR (500 MHZ, Acetone-$d_6$): d (ppm) 9.25 (d, 2H), 8.63 (s, 2H); 8.55 (m, 8H); 7.67 (d, 2H); 6.78 (s, 2H); 6.61 (d, 4H); 4.35 (m, 8H); 3.85 (m, 20H). $^{13}$C (125 MHZ, Acetone-$d_6$): d (ppm) 161.61, 160.65, 146.89, 146.88, 145.58, 143.72, 143.00, 142.65, 138.16, 133.57, 132.59, 130.56, 129.50, 128.10, 126.38, 123.64, 116.20, 111.81, 103.02, 71.69, 71.52, 70.04, 69.23, 66.24, 65.35, 62.99. MP (under argon): 175° C., (dec).

EXAMPLE 10

Rot(2,Zn)(ClO$_4$)$_2$

The synthesis described herein is depicted schematically in FIG. 5. To a 50 ml air-free Schlenk flask containing 20 mg (0.027 mmol) of 2 and 15.8 mg (0.027 mmol) of the macrocycle phenanthroline was added 25 ml of dry deoxygenated $CH_2Cl_2$. The orange yellow solution was stirred for ten minutes under argon and then 10.4 mg (0.027 mmol) of Zn(ClO$_4$)$_2$ in 2 ml of deoxygenated $CH_3CN$ solution was added. The solution turned to red immediately, and after stirring at RT for 10 h, the solvent was removed under vacuum. The crude product was dissolved in 5 ml of acetone under argon and filtered. The red product was precipitated from the filtrate with addition of ether and cooling to 0° C. under argon. A red solid was collected and dried to produce 20 mg of Rot(2,Zn). This compound was stored in a refrigerator under argon. $^1$H NMR (500 MHZ, Acetone-d$_6$): d (ppm) 9.26 (d, 2H, J=8.5 Hz); 8.63 (s, 2H); 8.52 (m, 8H); 7.68 (d, 4H J=8.5 Hz); 6.64 (d, 4H, J=8.5 Hz); 6.58 (s, 2H); 4.44–4.30 (m, 16H); 3.96–3.74 (b, 20H). $^{13}$C (125 MHz, Acetone-d$_6$): d (ppm) 164.02, 161.68, 156.53, 146.73, 145.00, 142.97, 142.57, 141.50, 141.00, 138.38, 137.29, 132.60, 130.60, 128.13, 126.44, 123.40, 116.68, 116.24, 116.22, 111.00, 109.78, 102.79, 100.609, 71.57, 71.55, 70.02, 70.00, 69.20, 66.39, 66.37, 66.25, 65.54. MP (under argon): 175° C. (dec).

EXAMPLE 11

Rot(2,Cu)(BF$_4$)

The synthesis described herein is depicted schematically in FIG. 5. To make to Rot(2,Cu), we use a method similar to that reported for Rot(2,Zn). The compound is brick red in color and was stored in refrigerator under argon. $^1$H NMR (300 MHZ, Acetone-d$_6$): d (ppm) 9.25 (d, 2H, J=9 Hz); 8.67 (s, 2H); 8.51(m, 8H), 7.69 (d, 4H, J=9 Hz), 6.65 (d, 4H, J=8.1 Hz); 6.58 (s, 2H); 4.30–4.26 (m, 16H), 3.73 (m, 20H). MP (under argon): 170° C. decomposed. The poor solubility of this compound prevented characterization by $^{13}$C NMR.

EXAMPLE 12

3,4-Ethylenedioxy-2,2'-bithiophene 2.0 g (14 mmol) EDOT and 1.63 g (28 mmol) TMEDA were dissolved in 50 ml of dry THF and the solution was cooled to −10° C. under argon. 8.8 ml of 1.6 M n-BuLi was slowly added to the solution. After stirring for 30 minutes., this reaction mixture was transferred to 50 ml of refluxing THF containing 4.97 g (14 mmol) Fe(acac)$_3$ under argon. The THF was removed after refluxing for 6 h. The resulting red solid was dissolved in CHCl$_3$, and quickly passed through a short bed of silica gel using CHCl$_3$ as eluent. The filtrate was dried and washed with ether. The resulted yellow solid was filtered and dried under vacuum to afford 0.99 g of product (Yield 99%). $^1$H NMR (250 MHZ, CD$_2$Cl$_2$): d (ppm) 6.25 (s, 2H), 4.31 (m, 8H); 4.21 (m, 8H). $^{13}$C (125 MHZ, Acetone-d$_6$): d (ppm) 141.23, 137.03, 109.90, 97.53, 64.99, 64.59. GC/MS: 282, calcd for C$_{12}$H$_{10}$O$_4$S$_2$: 282.00.

EXAMPLE 13

Synthesis of Polyrot(1,M) and Polyrot(2,M) M=Cu, Zn

Figure 6:
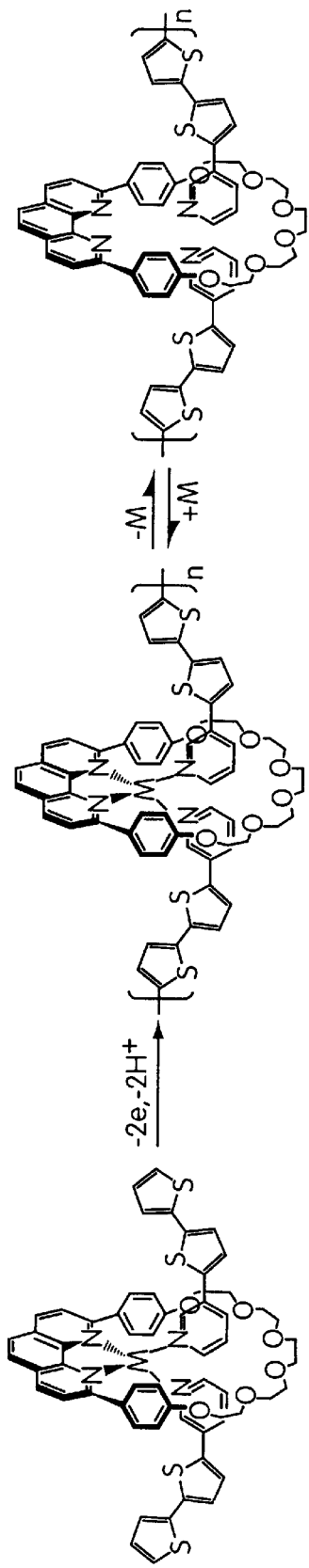
FIG. 6 is a schematic depiction of the oxidative polymerization step to form PolyRot(1,Zn), PolyRot(1,Cu), PolyRot (2,Zn), and PolyRot(2,Cu)
Figure 6:
Figure 6:
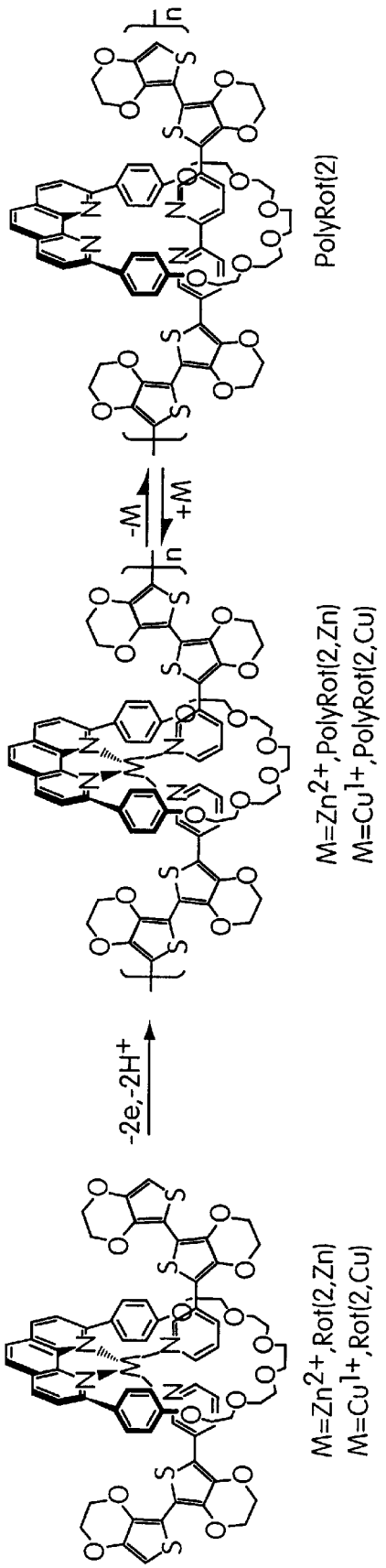

Referring to FIG. 6, the corresponding metallorotaxane monomers, Rot(1,Zn) and Rot(1,Cu), are oxidatively polymerized to generate polymetaflorotaxanes, PolyRot(1,Zn) and PolyRot(1,Cu). The corresponding metallorotaxane monomers, Rot(2,Zn) and Rot(2,Cu), are oxidatively polymerized to generate polymetallorotaxanes, PolyRot(2,Zn) and PolyRot(2,Cu). The oxidative polymerization is performed by using methods known to those of ordinary skill in the art.

EXAMPLE 14

Reversible Complexation of Metal Ions

Figure 7:
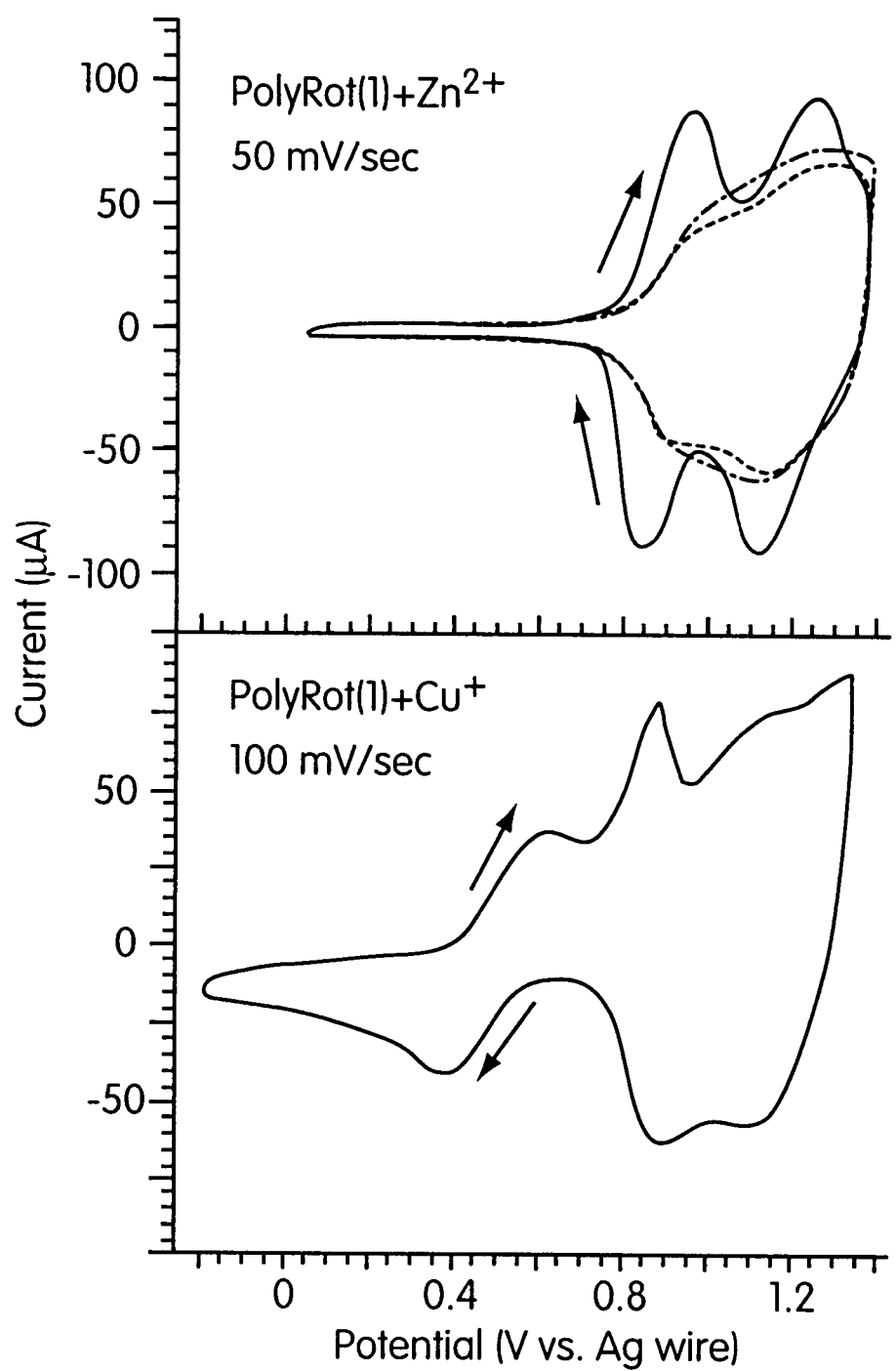
FIG. 7 displays cyclic voltammograms of PolyRot(1,Zn) and PolyRot(1,Zn) after treatment with base.

Referring to FIG. 6, the reversible binding of Zn$^{2+}$ to metal-free PolyRot(1) through optical absorption changes has been demonstrated. Noting that UV-Vis spectrum only reflects the changes in local electronic structure, we have further investigated the effects of interaction between polyrotaxane and the metal ions on the conductivity, which is a collective property. As shown in FIG. 7, the cyclic voltammogram of PolyRot(1,Zn) films displays two well-defined oxidation waves. Upon extraction of the Zn$^{2+}$ with base (ethylenediamine) treatment, the two oxidation waves lose definition and form a broad oxidation wave. Meanwhile, the UV-Vis spectrum displays a blue shift of the interband absorption, indicating generation of metal-free PolyRot(1). Immersion of PolyRot(1) in a saturated MeCN of Zn$^{2+}$ solution again produces PolyRot(1,Zn) with two unresolved oxidation waves and a red shift of the polymer-based UV-Vis absorption (FIG. 6). The partial recovery of the oxidation peaks suggests that the PolyRot(1) is only partially complexed with Zn$^{2+}$ ions. The weak binding effect probably results from the flexibility of the macrocycles to rotate or slide along the threading polymers after removal of the metal ions. Immersion of PolyRot(1) into saturated Cu$^{1+}$ or Cu$^{2+}$ solutions produces a similar red shift in the UV-Vis absorption. The cyclic voltammogram of PolyRot(1) after treatment with Cu$^{2+}$ only exhibits a very small peak at 0.49 V corresponding to the Cu$^{1+}$/Cu$^{2+}$ redox couple. The Cu$^{1+}$ treated PolyRot(1), however, produces a relatively large redox wave at 0.49 V associated with a electrochemically irreversible peak (FIG. 7). It is apparent that PolyRot(1) has a higher affinity to Cu$^{1+}$ with respect to Cu$^{2+}$, which is to be expected for the polyrotaxane structure with preassembled tetrahedral binding sites. Dipping the macrocycle-free Poly (1) in Cu$^{2+}$ solutions broaden the absorption spectrum, but no visible Cu$^{1+/2+}$ wave appears in the cyclic voltammogram. The interaction of Poly(1) to Cu$^{1+}$ solutions produce neither an absorption change nor a Cu$^{1+/2+}$ redox wave in the cyclic voltammogram. Thus, the rotaxane structure is key to metal binding, and Poly(1) shows no evidence of Zn$^{2+}$ binding under the same conditions.

In the case of the PolyRot(2) system, the contribution of the copper ion to the conductivity of PolyRot(2,Cu) makes this a particularly interesting system to study the reversible binding of Cu$^{1+}$ and Cu$^{2+}$. Our investigations of Cu$^{1+}$ and Cu$^{2+}$ complexation by PolyRot(2) have focused on electrochemical and conductivity studies.

Figure 8A:
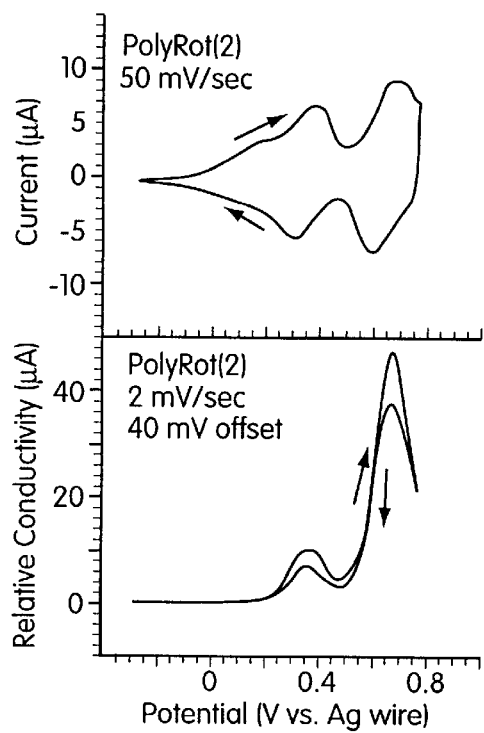
FIG. 8 displays cyclic voltammograms and conductivity profiles of PolyRot(2) and PolyRot(1,Cu)
Figure 8B:
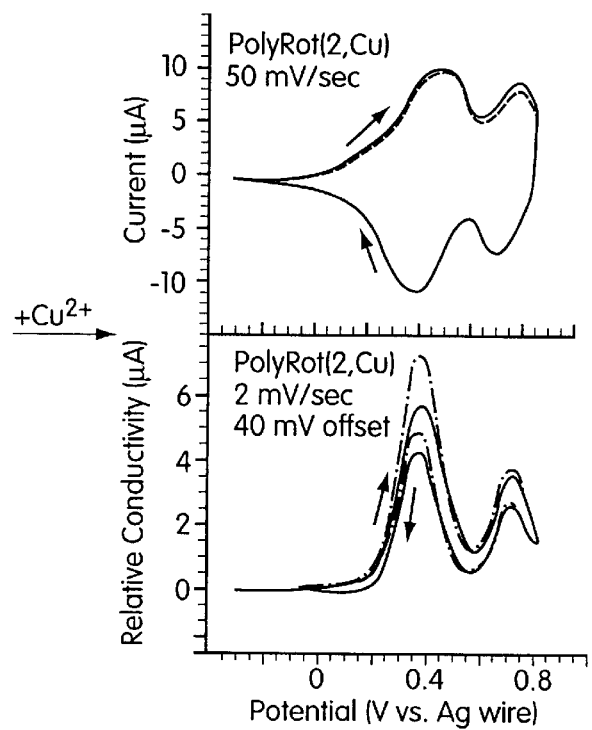
Figure 9A:
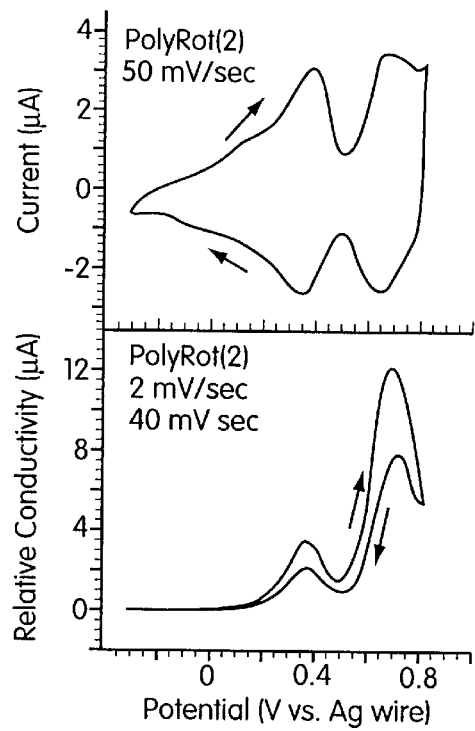
FIG. 9 displays cyclic voltammograms and conductivity profiles of PolyRot(2) after treatment with base followed by a reaction with $Cu(BF4)_2/CH_3CN$.
Figure 9B:
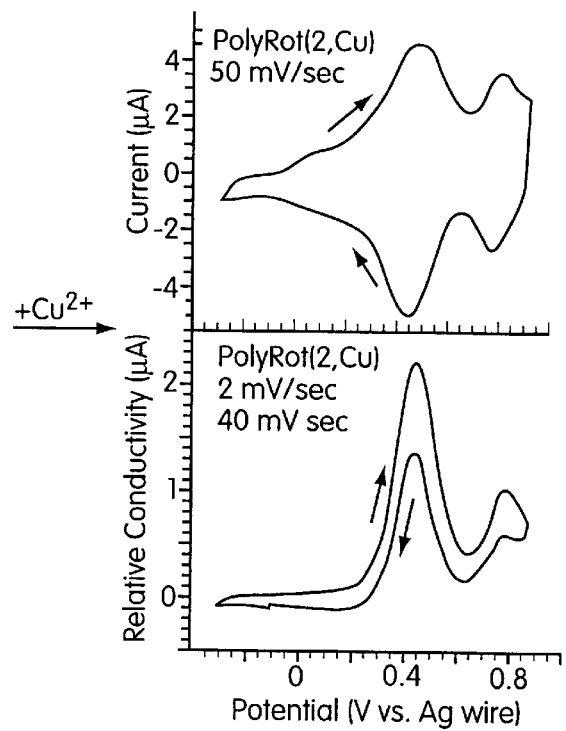

Metal-free PolyRot(2) is produced by ethylenediamine extraction of the metal ion from PolyRot(2,Cu) or PolyRot (2,Zn). The greenish-blue films of PolyRot(2,Cu) and PolyRot(2,Zn) turn red after ethylenediamine treatment, and electrochemistry displays features similar to those of Poly(2) (FIGS. 8a and 9a), suggesting the formation of metal-free PolyRot(2). The relative conductivity of PolyRot(2) is higher than those of PolyRot(2,Zn) and PolyRot(2,Cu), indicating that the increased flexibility in the metalfree structure allows for greater interchain interactions. UV-Vis spectroscopy of PolyRot(2) shows absorptions from the macrocycle phenanthroline between 250 and 400 nm after removal of the metal ions, thereby confirming that the rotaxane structures persists. The greenish-blue color is restored after dipping the metal-free PolyRot(2) into a saturated Cu(BF$_4$)$_2$/CH$_3$CN solution. As shown in FIGS. 8b and 9b, cyclic voltammograms of the reconstituted PolyRot (2,Cu) are the same as those for PolyRot(2,Cu) obtained from the polymerization of Rot(2,Cu). Also apparent from FIGS. 8 and 9 is the fact that the same material is formed regardless of which polyrotaxane is the starting material, PolyRot(2,Zn) or PolyRot(2,Cu), is used. The conductivity profiles shown in FIG. 8 indicate some structural evolution since the conductivity of the third scan is larger than that of the first scan. However, cyclic voltammetry displays identical behavior over several cycles. This last point speaks to the high sensitivity of conductivity to minor differences in a material. Both the electronic and structural properties of PolyRot(2) contribute to its strong affinity for $Cu^{2+}$ ions. Recall that PolyRot(1) doesn't display a high affinity for $Cu^{2+}$. The electron-rich and bulky EDOT moiety enhances the chelating ability of PolyRot(2) by increasing the basicity of the bipyridine and by biasing the macrocycle to prefer bipyridyl sites along the threading polymer. Thus, the EDOT-based polyrotaxane likely maintains rigid preorganized coordination sites and displays a qualitatively higher binding constant than PolyRot(1). We also investigated the interaction of PolyRot(2) in a saturated $Zn^{2+}$/MeCN solution. As expected, treating the PolyRot(2) with $Zn^{2+}$ ions shifts the cyclic voltammogram such that it coincides with that of as-synthesized PolyRot(2,Zn), which indicates the reconstruction of PolyRot(2,Zn). This result is consistent with PolyRot(1), which reversibly binds $Zn^{2+}$ ions in MECN solution.

EXAMPLE 15

Electrochemical Studies

All of the polymers investigated were synthesized by anodic electrochemical deposition. By this method, polymers can be deposited on microelectrode arrays for in situ cyclic voltammetry and relative conductivity measurements. Likewise deposition on indium-tin-oxide (ITO) sheet enables UV-Vis spectroelectrochemical measurements. Using techniques described elsewhere, the conductivity is determined as a function of the applied electrochemical potential on the same functionalized electrodes that are used for cyclic voltammetry analysis. All electrochemical polymerization and measurements were performed in 0.1 M $(n-Bu)_4NPF_6/CH_2Cl_2$ electrolyte solution in an air-free drybox under low intensity lighting. An Ag wire is used as the quasi-reference electrode and ferrocene ($E^{O'}$=0.40 V) was used as a reference potential.

Typical thiophene-based conducting polymers exhibit cyclic voltammograms which are composed of broad unresolved waves indicating a high degree of delocalization. Additionally, the conductivity profiles of thiophene-based conductors generally displays a single window of conductivity for a given type of doping. In polymers displaying redox-based conductivity, electrons hop between localized redox centers. For systems having equivalent structures and oxidation potentials, the rate of self-exchange (SE) electron transfer (ET) processes conforms to the simple equation, $R_{SE}=k_{ET}[A][A^+]$, indicating a proportional relationship to the product of the concentrations of the reduced (A) and oxidized ($A^+$) species. This dictates that for a fixed amount of redox active species ($[A]+[A^+]$=constant) the self-exchange rate between the oxidized and reduced states, and hence conductivity, will reach a maximum when the concentration of the oxidized and reduced species are equal, i.e. $[A]=[A^+]$. Thus, if a redox polymer's cyclic voltammogram exhibits multiple redox peaks, so too will the conductivity profile.

The electrochemical and conducting properties of Poly(1) have been reported. Poly(1) displays two unresolved oxidation peaks and resembles the behavior typical of polythiophene derivatives. Due to the electron-deficient character of its bipyridine moiety, Poly(1) is easier to reduce than polythiophene, and conductivity measurements indicate that Poly(1) displays stable conducting current in both p- and n-doping states. As shown in Scheme 3, the corresponding metallorotaxane monomers, Rot(1,Zn) and Rot(1,Cu), are oxidatively polymerized to generate polymetallorotaxanes, PolyRot(1,Zn) and PolyRot(1,Cu).

Figure 10A:
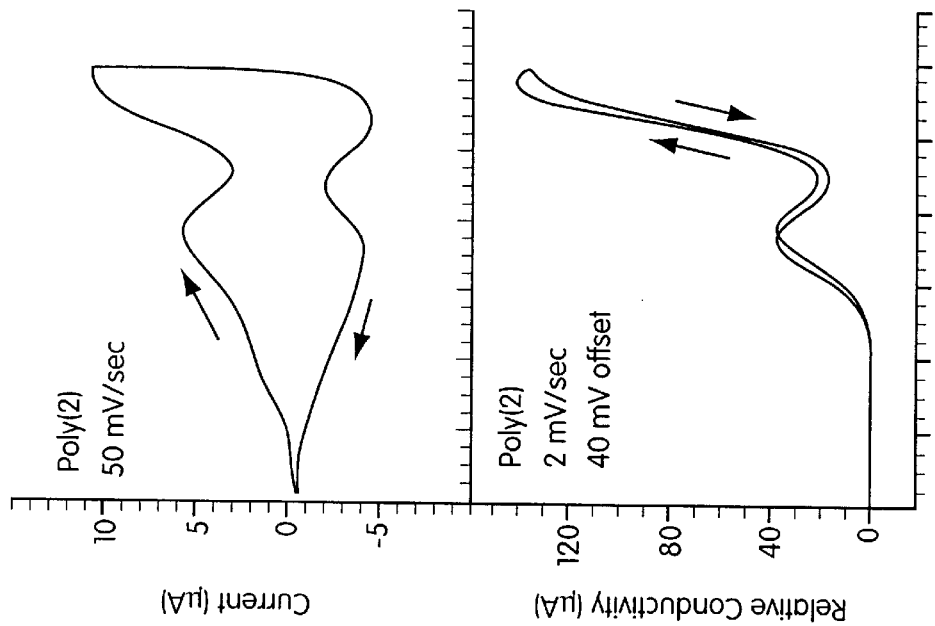
FIG. 10 displays cyclic voltammograms and conductivity profiles of Poly(2) and after treatment with ethylenediamine.

As expected, the oxidation potential required to polymerize 2 (polymerized by cycling the working electrode between –0.22 V and 0.95 V) is lower than that required to polymerize 1 (cycling between –0.2 V and 1.2 V). The resulting films of Poly(2) are dark purple in their reduced form. Electrochemical and conductivity measurements on films of Poly(2) using interdigitated microelectrodes show several interesting properties (FIG. 10a). The cyclic voltammogram of Poly(2) displays two oxidation waves (Table 1 and FIG. 10a) with almost equal peak currents. A linear relationship between the peak currents and scan rate confirms that the electroactive species

TABLE 1

The apparent formal reduction potential $E^{O1}$ (V vs. Ag wire)[a] of the two redox processes of each polymer

|  | $E^{O1}$ (V) Polymers | | $E^{O1}$ (V) Metal-free Polyrotaxanes | |
| --- | --- | --- | --- | --- |
| Poly(1) | 1.12 | 1.29 | — | — |
| Poly(2) | 0.43 (0.34)[b] | 0.79 (0.74)[b] | — | — |
| PolyRot(1,Zn) | 0.96 | 1.24 | 0.96–1.24[c] | |
| PolyRot(1,Cu) | 0.98 | 1.26 | 0.98–1.26[c] | |
| PolyRot(2,Zn) | 0.41 | 0.74 | 0.36 | 0.64 |
| PolyRot(2,Cu) | 0.49[c] | 0.79 | 0.41 | 0.71 |

[a]$E^{O1}$ = ($E_{pa}$ + $E_{pc}$)/2.
[b]Values in parentheses are for the material after treatment with ethylenediamine.
[c]After base treatment, the two polymer-based redox peaks lose their definition and give a broad redox wave over the indicated potential region.

are surface confined. The conductivity profile shows the first maximum to be at the same potential as the first oxidation wave. After passing through the first wave, a slight drop in the conductivity is observed before reaching a second maximum (s=$3.5 \times 10^{-2}$ S/cm) at the half-wave potential of the second oxidation wave. In other words, the conductivity of Poly(2) results from two discrete redox waves which produce two windows of peak conductivity. This correspondence between redox processes and the conductivity suggests that Poly(2) behaves as a charge localized redox conductor.

Figure 10B:
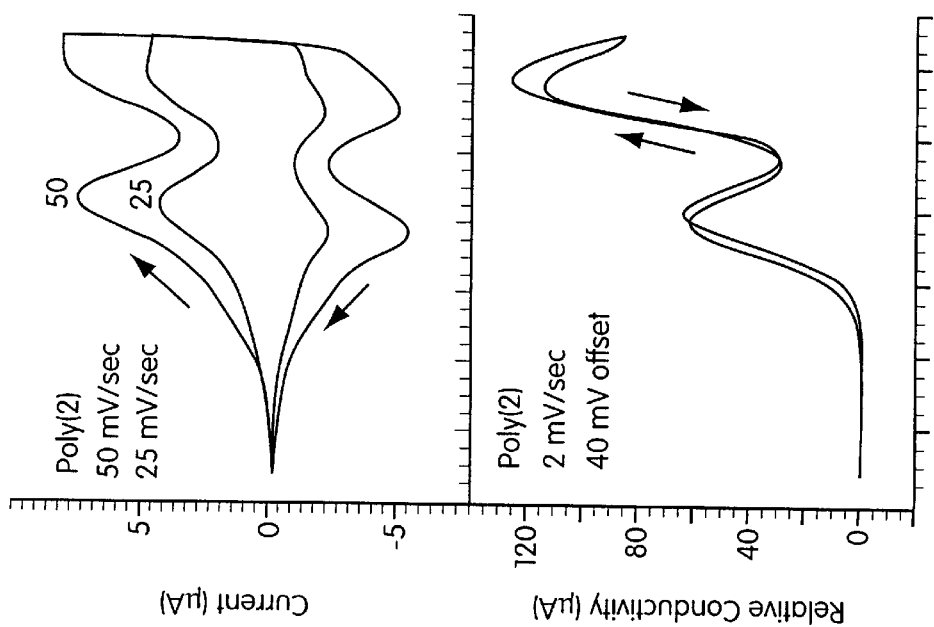

Considering that the electrochemical polymerization process produces protons, we suspected that, the as synthesized film of Poly(2) may be protonated. Indeed, rinsing films of Poly(2) with base (ethylenediamine) immediately transformed the films to a red color and also produced a broader and less defined cyclic voltammogram. As shown in FIG. 10b, the cyclic voltammogram still displays the two oxidation waves and two conductivity maxima after ethylenediamine treatment. However, deprotonation results in a negative shift of the oxidation potentials (Table 1), indicating that the neutralized polymer is easier to oxidize. Base treatment also changes the shape of the conductivity profile, and we observed a decrease in the first conductivity wave and a slight conductivity increase commensurate with the second oxidation wave.

As we have reported previously, PolyRot(1,Zn) displays a cyclic votammogram with two partially resolved one-electron waves. Additionally, the conductivity exhibits the characteristics of a localized redox system with conductivity peaks ($S_{max}$=$3.7 \times 10^{-4}$ S/cm) corresponding directly with the half-wave potentials. PolyRot(1,Cu) displays two less resolved waves similar to PolyRot(1,Zn) and an additional $Cu^{1+/2+}$ wave at a less positive potential. The $Cu^{1+/2+}$ wave displays a large hysteresis ($\Delta E_p$=$E_{pc}$–$E_{pa}$=118 mV at 50 mV/sec), and due to this kinetic sluggishness, no measurable redox conductivity was associated with the $Cu^{1+/2+}$ wave.

Figure 11B:
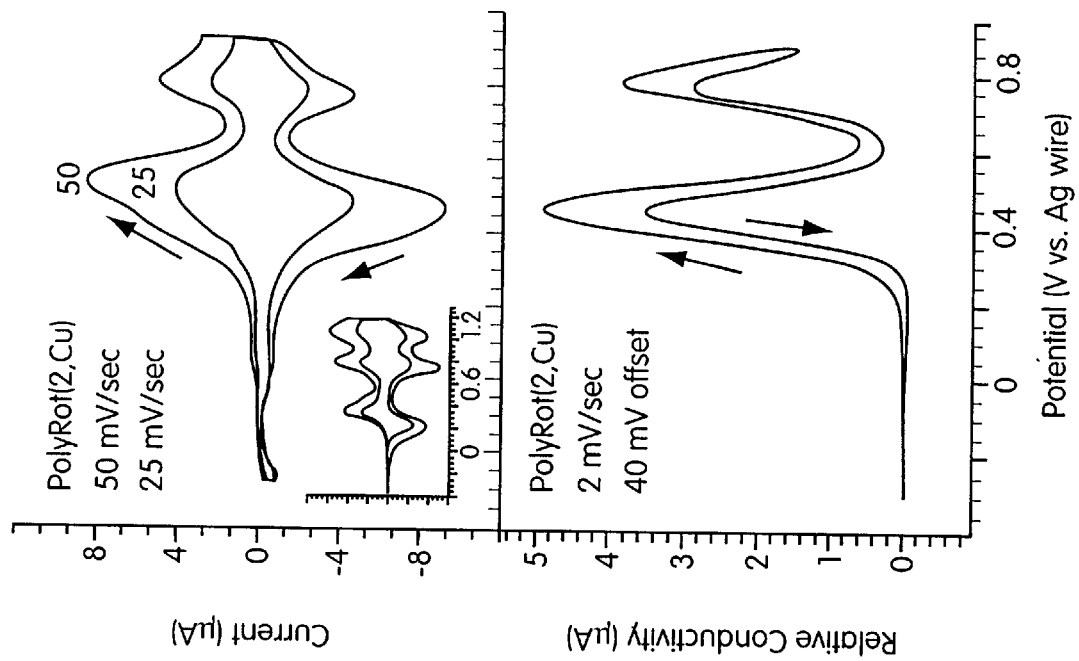
FIG. 11 displays cyclic voltammograms and conductivity profiles of PolyRot(2,Zn) and PolyRot(2,Cu)
Figure 11A:
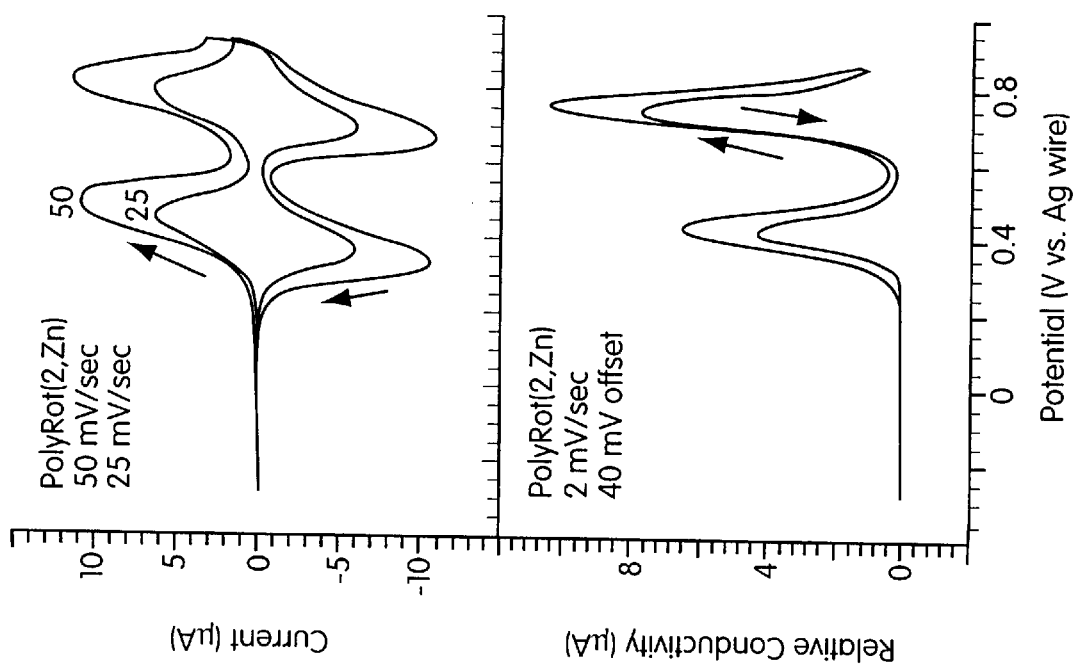

The polymetallorotaxanes formed with 2 display interesting electrochemical behaviors which are dramatically influenced by metal ion complexation. Electrolyte solutions of either Rot(2,Zn) (0.77 mM) or Rot(2,Cu) (0.46 mM) were electrochemically polymerized by cycling between −0.4 and 1.15 V to generate greenish-blue films. As shown in FIG. 11, a striking feature of the cyclic voltammogram is the well-resolved localized nature of the redox waves. Both PolyRot (2,Zn) and PolyRot(2,Cu) display behavior typical of reversible surface-confined localized redox sites with small $\Delta E_p$ and a linear relationship between the scan rate and peak currents. PolyRot(2,Zn) displays two polymer-based redox peaks with equal peak currents (FIG. 11a). The relative conductivity (current) of PolyRot(2,Zn) correlates with this electroactivity and reaches a local maximum at the half-wave potential of the first oxidation peak. The conductivity then drops nearly to a baseline level before rising to its highest level (s=$6.8 \times 10^{-4}$ S/cm) at a potential which is coincident with the second redox wave. From these cyclic voltammogram and conductivity investigations we conclude that PolyRot(2,Zn) behaves as a redox conductor with rapid electron transfer between localized redox states in the polymer backbone. The localized redox conductor characteristics are more pronounced in PolyRot(2,Zn) than in Poly(2), which indicates that the complexation of $Zn^{2+}$ ions results in enhanced charge localization in the polymer backbone. We also note that PolyRot(2,Zn)'s behavior is consistent with the behavior of Poly(2) which displays more localized behavior in its protonated form.

PolyRot(2,Cu) displays two oxidation waves in its cyclic voltammogram (FIG. 11). A comparison with the electrochemical behavior of PolyRot(1,Cu), shown as an inset in FIG. 11 top, illustrates how the electron-rich character of the Poly(2) backbone produces a negative shift of the two polymer centered oxidation peaks to a region which overlaps with the $Cu^{2+}$ wave. This results in a 0.49 V wave that is approximately twice as large as the wave at higher potential. Close inspection indicates that the former contains two unresolved waves. The conductivity profile of PolyRot(2, Cu) shown in FIG. 11 is also indicative of redox behavior. However, this behavior is different from PolyRot(2,Zn) in that the first conducting peak (s=$1.3 \times 10^{-3}$ S/cm) for PolyRot (2,Cu) is now considerably larger than the second peak. This last feature is significant since our investigations of PolyRot (1,Zn), PolyRot(1,Cu), PolyRot(2,Zn), Poly(1), and Poly(2) consistently show a smaller relative conductivity associated with the wave at lower potential and maximum at higher potential. The $Cu^{1+/2+}$ waves in both PolyRot(1,Cu) and PolyRot(2,Cu) also provide an internal coulometric reference, which indicates that the threading polymers (i.e. Poly(1) and Poly(2)) of the polyrotaxanes exhibit two sequential one-electron oxidation processes for each repeating unit.

EXAMPLE 16

Conductivity Studies

Figure 12:
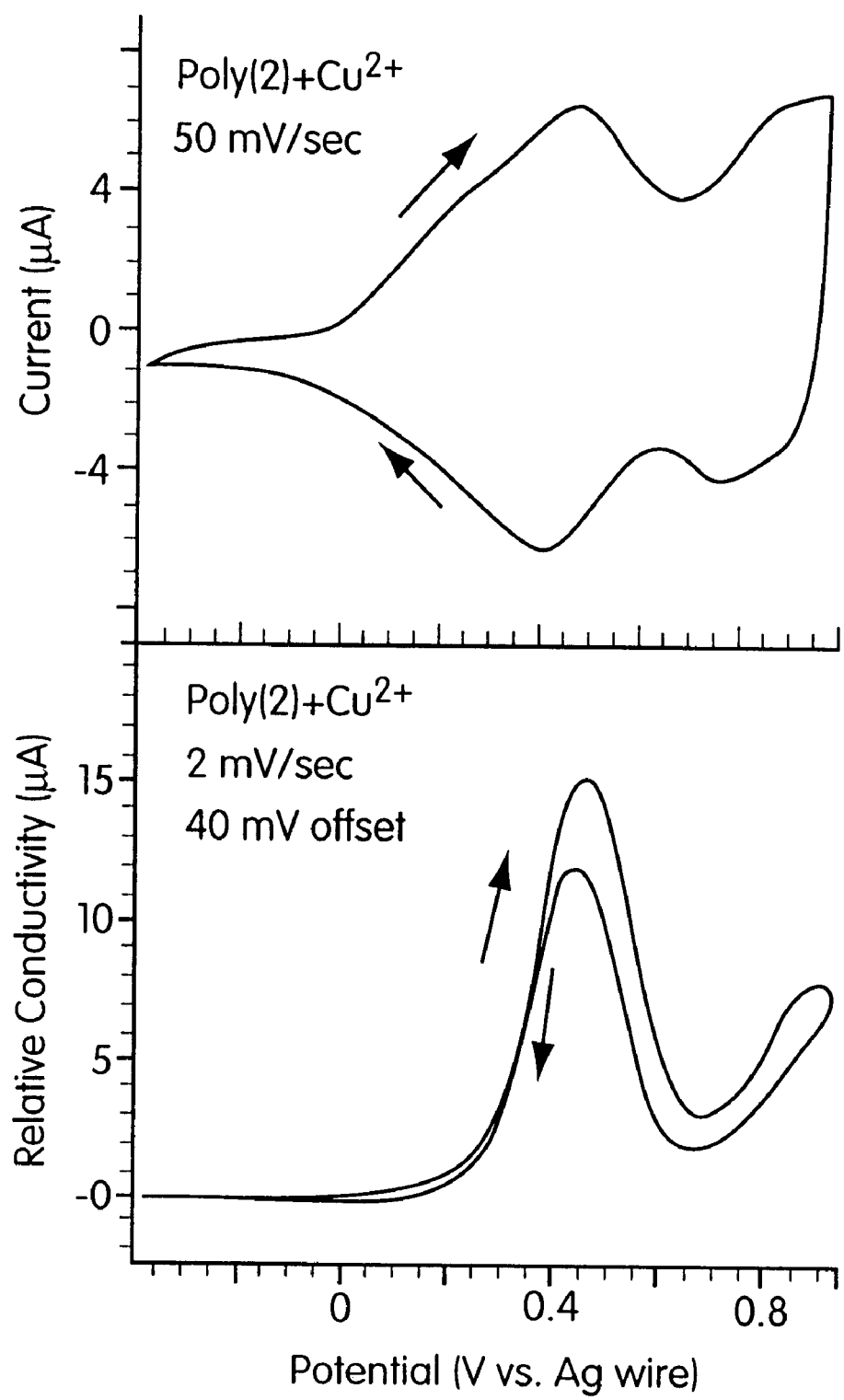
FIG. 12 displays cyclic voltammograms and conductivity profiles of Poly(2) after treatment with base followed by complexation with $Cu^{2+}$.

For comparison, we conducted the same $Cu^{2+}$ and $Zn^{2+}$ treatment with neutral Poly(2), which has no macrocyclic component. In contrast to what we observed for Poly(1), the films Poly(2) turned blue after dipping into $Cu^{2+}$ solution. Although the cyclic voltammogram and conductivity profiles are similar to those of PolyRot(2,Cu) (FIG. 12), close inspection reveals that the second oxidation wave is 120 mV more positive than that of PolyRot(2,Cu). Treating Poly(2) with $Zn^{2+}$ ions revealed that neutral Poly(2) also binds $Zn^{2+}$ to produce a positive shift of the cyclic voltammograms to the potentials near which the protonated Poly(2) was oxidized. These results imply that 2 is a stronger chelating ligand than 1. However, the difference between the electrochemistry of $Cu^{2+}$-treated Poly(2) and PolyRot(2,Cu) indicates that the binding mode is different in Poly(2,Cu). Considering that nitrogen, sulfur and oxygen are all good donors, a variety of binding modes can exist. One possibility is interchain coordination of $Cu^{2+}$; however, it will be difficult to elucidate the binding modes.

As mentioned in the introduction, the close match of the oxidation potentials of the $Cu^{1+/2+}$ couple and Poly(2) or PolyRot(2) enables the polyrotaxanes to be oxidatively doped with $Cu^{2+}$ binding. Since complexation and oxidation of the polyrotaxanes by $Cu^{2+}$ will transform the insulated polyrotaxanes to conducting polymetallorotaxanes, the polymer's resistance should dramatically change. To detect these changes in resistance, we used an electrometer to measure the resistance of the undoped PolyRot(2,Zn) deposited on the interdigitated electrodes. We also measured the resistance changes after removal of $Zn^{2+}$ ions to form PolyRot(2) and in doped PolyRot(2,Cu) formed by treatment with $Cu^{2+}$ ions. The polymer films were taken out of the electrolyte solutions and dried under vacuum for 10 minutes before resistance measurement were performed.

The blank interdigitated microelectrode exhibited $1 \times 10^{12}$ $\Omega$ resistance, and when the electrodes were coated with undoped PolyRot(2,Zn) films, the resistance dropped to $7.0 \times 10^9$ $\Omega$. Removal of the $Zn^{2+}$ ions to give PolyRot(2) increased the resistance slightly to $4.0 \times 10^{10}$ $\Omega$. More significantly, however, the resistance dropped dramatically to $3.2 \times 10^4$ $\Omega$ after treating PolyRot(2) with $Cu^{2+}$ solution. Cyclic voltammetry and conductivity measurements confirm the formation of PolyRot(2,Cu). Thus, $Cu^{2+}$ complexation to PolyRot(2) produces a >$10^6$-fold increase in conductivity. This result suggests that PolyRot(2) backbone is oxidized by $CU^{2+}$ ions to generate PolyRot(2,Cu) with charge carriers in the polymer backbone. In a control experiment, we have shown PolyRot(2) shows less than 10 fold change in resistance after treatment with $Cu^{1+}$ or $Zn^{2+}$ ions. In a similar resistance experiment, PolyRot(1), which has higher oxidation potential than PolyRot(2), only produces $10^2$-fold resistance decrease when interacting with $Cu^{2+}$.

Similar resistance measurements were carried out on macrocycle-free Poly(2) and Poly(1). The same electrode coated with a protonated film of Poly(2) displayed a resistance of $2.3 \times 10^6 \Omega$. Removal of the protons increased the resistance to $2.6 \times 10^{10} \Omega$. Treatment with $Cu^{2+}$ results in a resistance as small as $1.0 \times 10^3$ $\Omega$ (a drop of >$10^7$), which again suggests that $Cu^{2+}$ is not only functioning as a Lewis acid but also doping Poly(2). However, Poly(1) only generates a $10^2$-fold decrease in resistance when interacting with $Cu^{2+}$ ions. This further demonstrates that the doping of the polymer by $Cu^{2+}$ is the major contribution to the conductivity increase in Poly(2).

EXAMPLE 17

2-Tributylstannyl-3,4-ethylenedioxythiophene

Figure 13:
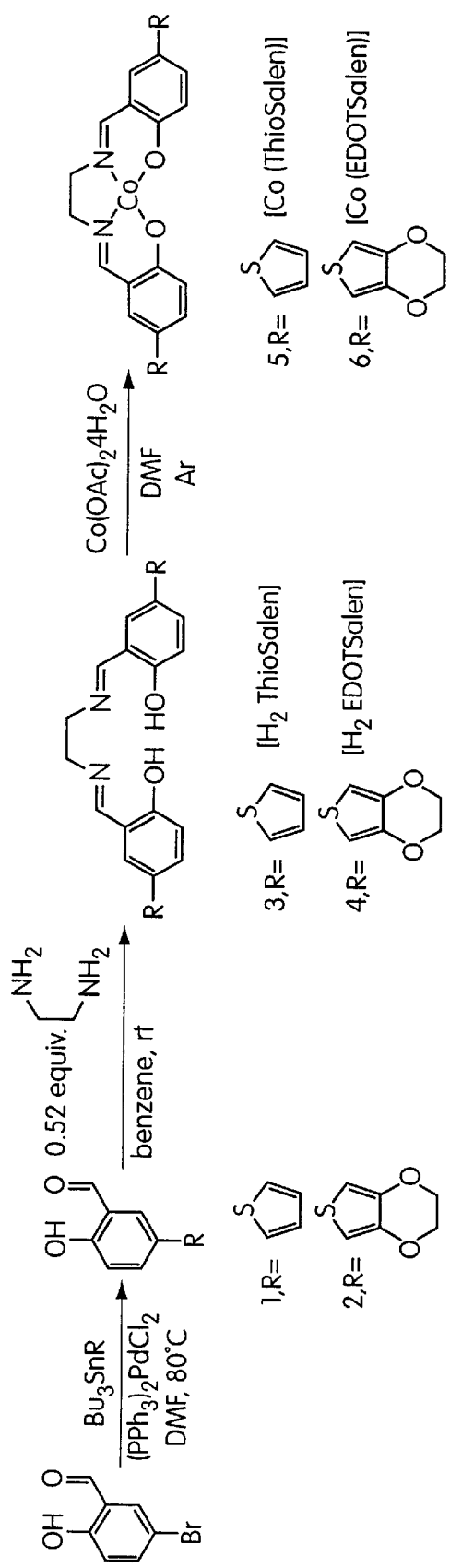
FIG. 13 is a schematic depiction of the synthesis of N,N'-Ethylenebis(5-(2-thienyl)salicylideniminato)cobalt(II) (5) and N,N'-Ethylenebis(5-(2-(3,4-ethylenedioxy)thienyl) salicylideniminato)cobalt (II) (6)

A structure of the product is depicted schematically in FIG. 13. To a cold (−15° C.) solution of 3,4-ethylenedioxythiophene (EDOT) (20 ml, 188 mmol) in 350 mL of THF were slowly added 138 mL (207 mmol, 1.1 equiv) of "BuLi. The white slurry was allowed to stir at −15° C. for 3 h before the addition of 61.6 mL (227 mmol, 1.2 equiv) of $Bu_3SnCl$. The beige slurry was allowed to stir while warming to room temperature for 18 h. The solvent was removed under vacuum and then stirred in hexane for 30 min. The slurry was filtered through Celite and the amber filtrate was removed under vacuum to yield a yellow-orange oil which was purified by distillation (b.p. 120° C./30 mTorr) to yield 79.6 g (185, mmol 98%) of pale yellow oil. $^1$H NMR (CDCl$_3$) δ6.57 (s, 1H), 4.20–4.10 (m, 4H), 1.62–1.50 (m, 6H), 1.40–1.25 (m, 6H), 1.12–1.06 (m, 6H), 0.89 (t, 3H). MS m/z 433 (M+H$^+$); HRMS (FAB) m/z 433.1225 (M+H$^+$); calcd for C$_{18}$H$_{32}$O$_2$SSn m/z 433.1223 (M+H$^+$).

EXAMPLE 18

5-(2-Thienyl)salicylaldehyde (1)

The synthesis of this compound is depicted schematically in FIG. 13. To a mixture of 5-bromosalicylaldehyde (2.847 g, 14.16 mmol) and Cl$_2$Pd(PPh$_3$)$_2$ (0.497 g, 0.708 mmol, 0.05 equiv) was added tributylstannyl thiophene (6.75 mL, 21.24 mmol, 1.5 equiv) in 25 mL of DMF. The reaction mixture was heated at 80° C. 16 h, over which time the reaction color changed from light yellow to dark red. The reaction was cooled, diluted with Et$_2$O and washed with dilute NH$_4$Cl (4×150 mL). The organic layer was collected and filtered through a short silica pad to yield a yellow filtrate. The solvent was removed under reduced pressure to afford a gummy yellow solid, which was transferred to a frit and washed with hexanes. The yellow solid was dried in vacuo to afford 1.895 g (9.28 mmol, 66%) of a yellow powder (mp 102–103° C.). $^1$H NMR (CDCl$_3$) δ11.01 (s, 1H), 9.96 (s, 1H), 7.80–7.76 (m, 2H), 7.29–7.24 (m, 2H), 7.11–7.07 (dd, 1H), 7.05–7.02 (dd, 1H). $^{13}$C NMR (CDCl$_3$) δ196.5, 161.1, 142.7, 134.7, 130.8, 128.3, 127.1, 124.8, 123.0, 120.8, 118.4. MS m/z (204 (M$^+$). HRMS (FAB) found m/z 205.0324 (M+H$^+$); calcd for C$_{11}$H$_9$O$_2$S m/z 205.0323 (M+H$^+$).

EXAMPLE 19

5-(2-(3,4-Ethylenedioxy)thienyl)salicylaldehyde (2)

The synthesis of this compound is depicted schematically in FIG. 13. A 50 mL schlenk flask was charged with 5-bromosalicylaldehyde (2.408 g, 11.98 mmol) and Cl$_2$Pd (PPh$_3$)$_2$ (0.420 g, 0.599 mmol, 0.05 equiv). To this was added 2-tributylstannyl-3,4-ethylenedioxythiophene (8.784 g, 20.37 mmol, 1.7 equiv) in 25 mL of DMF. The reaction mixture was heated to 80° C. for 18 h, over which time the reaction color changed from light yellow to dark red. The solvent was removed under vacuum and the resulting oil was dissolved in 350 mL of EtOAc and washed with dil. NH$_4$Cl (6×100 mL). The organic layer was filtered through a pad of silica and the solvent was removed to yield a thermally- and light-sensitive yellow-green solid (0.846 g, 3.23 mmol, 27%), mp 132° C., dec. $^1$H NMR (CDCl$_3$) δ10.98 (s, 1H), 9.94 (s, 1H) 7.92 (d, 1H, J=2.3 Hz), 7.84 (dd, 1H, J=2.4 and 8.7 Hz), 7.00 (d, 1H, J=8.7 Hz), 6.29 (s, 1H), 4.34–4.25 (m, 4H). MS m/z 262 (M$^+$). HRMS (FAB) found m/z 263.0378 (M+H$^+$); calcd for C$_{13}$H$_{11}$O$_4$S m/z 263.0378 (M+H$^+$).

EXAMPLE 20

N,N'-Ethylenebis(5-(2-thienyl)salicylidenimine) (3)

The synthesis of this compound is depicted schematically in FIG. 13. To a stirred solution of 5-(2-thienyl) salicyladehyde (117 mg, 0.575 mmol) in 10 mL of benzene was added ethylenediamine (0.020 mL, 0.299 mmol, 0.52 equiv). The reaction mixture was stirred at room temperature for 10 min then heated to reflux for an additional 30 min. The solvent was removed under reduced pressure to yield 97 mg (0.224 mmol, 78%) of yellow powder (mp 255° C., dec), pure by $^1$H NMR. $^1$H NMR (CDCl$_3$) δ13.29 (2, 2H), 8.43 (s, 2H), 7.55 (dd, 2H, J=2.4 and 8.4 Hz), 7.46 (d, 2H, J=2.3 Hz), 7.22–7.16 (m, 4H), 7.05 (dd, J=3.6 and 5.0 Hz, 2H), 6.97 (d, 2H, J=8.7 Hz), 3.99 (s, 4H). MS m/z 432 (M$^+$). HRMS (EI) found m/z 432.0964 (M$^+$); calcd for C$_{24}$H$_{20}$N$_2$O$_2$S$_2$ (M$^+$) 432.0966.

EXAMPLE 21

N,N'-Ethylenebis(5-(2-(3,4-ethlenedioxy)thienyl) salicylidenimine) (4)

The synthesis of this compound is depicted schematically in FIG. 13. To a stirred solution of 5-(2-(3,4-ethylenedioxythienyl)salicylaldehyde (0.335 g, 1.28 mmol) in 10 mL of benzene was added ethylenediamine (0.044 mL, 0.664 mmol, 0.52 equiv). The resulting yellow slurry was stirred at room temperature overnight. Removal of solvent afforded 0.316 g (0.576 mmol, 90%) of yellow solid (mp 245° C., dec.). $^1$H NMR (CDCl$_3$) δ13.26 (s, 2H), 8.41 (s, 2H), 7.63–6.70 (m, 4H), 6.95 (d, 2H, J=8.3 Hz), 6.22 (s, 2H), 4.3 5–4.22 (m, 8H), 3.97 (s, 4H). MS m/z 549 (M+H$^+$). HRMS (FAB) found m/z 549.1157 (M+H$^+$); calcd for C$_{28}$H$_{25}$N$_2$O$_6$S$_2$ m/z 549.1154 (M+H$^+$).

EXAMPLE 22

N,N'-Ethylenebis(5-(2-thienyl)salicylideniminato) cobalt(II) (5)

The synthesis of this compound is depicted schematically in FIG. 13. Under an argon atmosphere, 0.275 g (0.636 mmol) of N,N'-ethylenebis (5-(2-thienyl)salicylidenimine) (3) and 0.158 g (0.636 mmol) of Co(OAc)$_2$.4H$_2$O were combined in 4 mL of DMF and allowed to stir at room temperature overnight. The black slurry was filtered through a Schlenk frit and a black solid obtained was washed with DMF and dried under vacuum to yield 0.257 g (0.525 mmol, 83%) black microcrystalline solid, mp>250° C. MS m/z 489 (M$^+$). HRMS (EI) found m/z 489.0144 (M$^+$); calcd for C$_{24}$H$_{18}$CoN$_2$O$_2$S$_2$ (M$^+$) 489.0142.

EXAMPLE 23

N,N'-Ethylenebis(5-(2-(3,4-ethylenedioxy)thienyl) salicylideniminato)cobalt (II) (6)

The synthesis of this compound is depicted schematically in FIG. 13. Under an argon atmosphere, 0.242 g (0.441 mmol) of N,N'-ethylenebis(5-(2-(3,4-ehtylenedioxy) thienyl)salicylidenimine) (4) and 0.110 g (0.441 mmol) of Co(OAC)$_2$.4H$_2$O were combined in 3 mL of DMF and allowed to stir at room temperature overnight. The black slurry was filtered through a Schlenk frit and the black solid obtained was washed with DMF and dried under vacuum to yield 0.257 g (0.525 mmol, 83%) green-black microcrystalline solid, mp>250° C.

EXAMPLE 24

Synthesis and Electrochemical Studies of Pol(5)

Figure 14A:
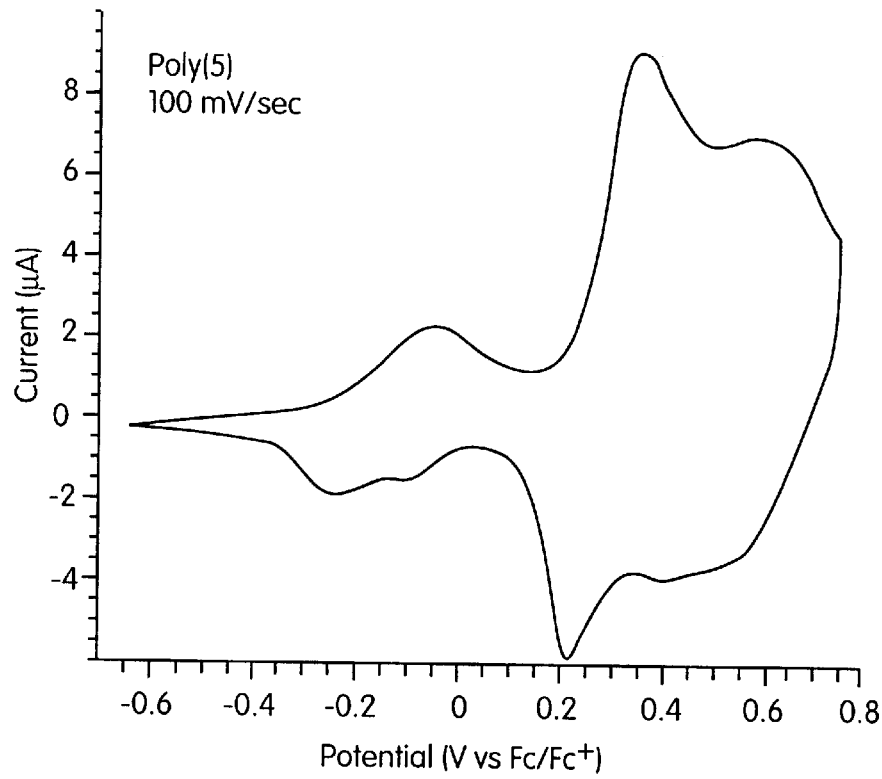
FIG. 14 displays cyclic voltammograms and conductivity profiles of Poly(5)
Figure 14B:
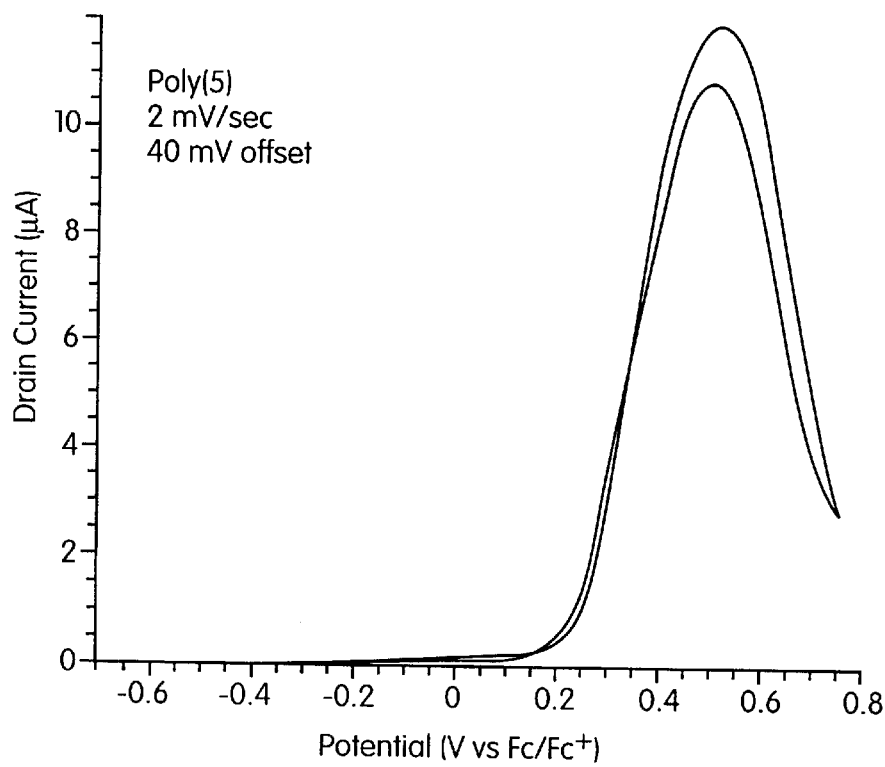

Referring to FIG. 13, reaction of 1 with cobalt acetate in DMF under an argon atmosphere afforded the corresponding Co(ThioSalen) (5) in high yield. Oxidative electrochemical polymerization of 5 in Bu$_4$NPF$_6$/MeCN readily results in the formation of a gold-colored film on the electrode surface. Interestingly, subjecting the parent H$_2$ThioSalen to the same conditions did not result in polymer deposition. Cyclic voltammetry of a film of Poly(5) is shown in FIG. 14. A quasi-reversible Co(II/III) wave at −0.1 V is followed by two larger polymer based waves at 0.3 and 0.6 V. If we make the assumption that two electrons per phenyl-thiophene-thiophene-phenyl repeat unit can be removed with oxidation, only a fraction of the cobalt centers are observed. A cursory examination of peak areas in the CV shows the ratio of metal to organic-centered redox waves to be approximately 1:7; hence, we can estimate that about 28% of the Co centers are electrochemically active in this film. This decay in electroactivity can be attributed to the thickness of the film (calculated to be ca. 130 Å) and the inability of electrons to shuttle out to the outer layers of the film while the polymer is in its reduced state. The films generated are stable to repeated scanning from −0.8–0.85 V, with all species being surface confined, as confirmed by analysis of peak current versus scan rate. In situ conductivity experiments on a 5 μm interdigitated microelectrode show that there is no contribution of the Co(II/III) redox wave to the conductivity. The maximum drain current, which is proportional to conductivity, occurs at the same potential as the second polymer oxidation wave. The absolute conductivity of the film at this point is estimated to be $2.3 \times 10^{-3}$ S·cm$^{-1}$, taking into account the polymer thickness and the physical parameters of the interdigitated microelectrode.

EXAMPLE 25

Synthesis and Electrochemical Studies of Poly(6)

Figure 15A:
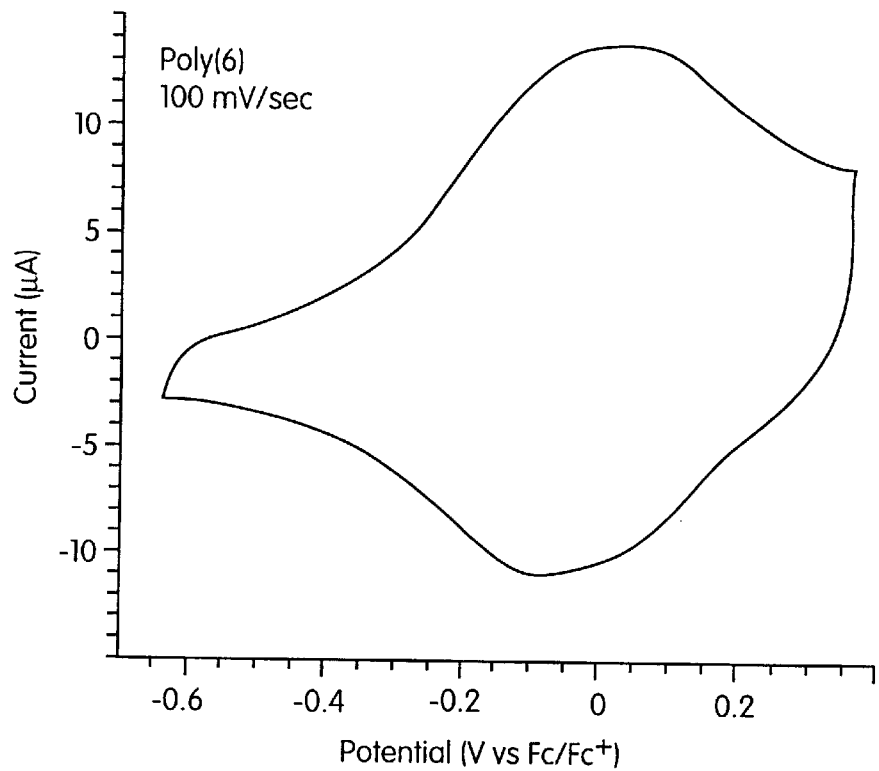
FIG. 15 displays cyclic voltammograms and conductivity profiles of Poly(6)
Figure 15B:
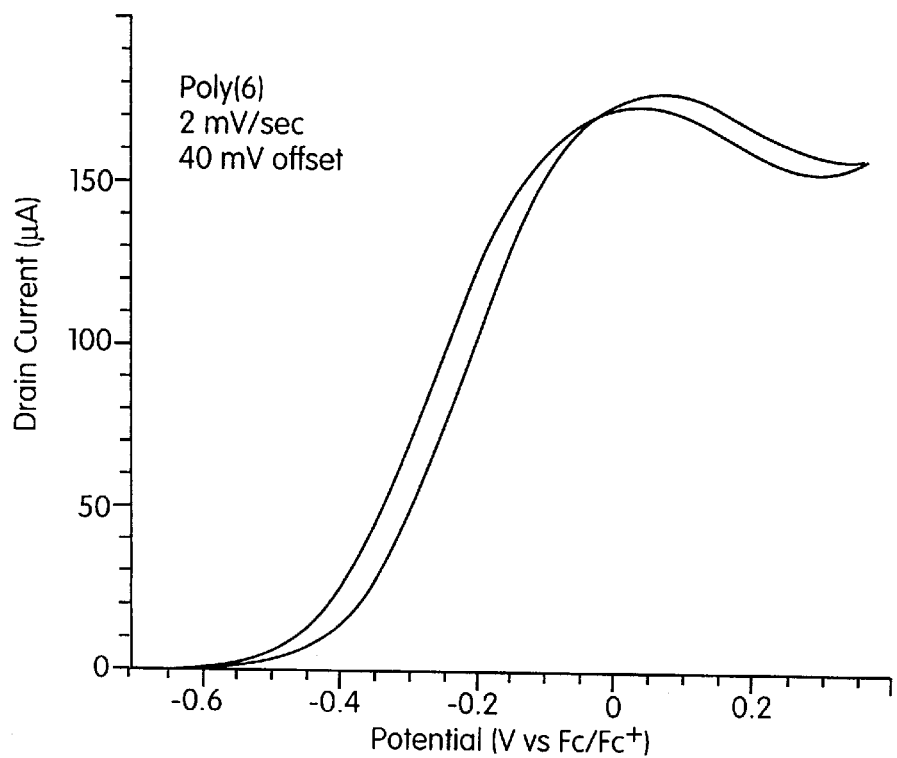

In order to more effectively bring the polymer and metal into electronic communication, thiophene was replaced by 3,4-ethylenedioxythiophene (EDOT) to serve as the electrochemically polymerizable substituent (FIG. 13). The ligand H$_2$EDOTSalen (4) and the cobalt complex 6 were synthesized in similar fashion to 3 and 5. Electrochemical polymerization of 6 in Bu$_4$NPF$_6$/MeCN affords a red polymer on the electrode surface. It is readily apparent from the CV of the film in fresh electrolyte that the oxidation potential of the polymer has been lowered significantly (FIG. 15). In fact, a broad wave for both the Co(II/III) and polymer redox processes is observed to have two overlapping broad waves at −0.05 and 0.1V. Also observed when scanning below −0.5 V, is a wave assigned to the Co(I/II) redox process (FIG. 16), although it has very low electroactivity, as was the case for the Co(II/III) wave in Poly(5). These films are stable to repeated scanning between −0.65 V and 0.35 V, and plots of peak currents versus scan rate shows that all species are surface confined.

The conductivity profile of Poly(6) shows a broad trace increasing from approximately −0.4 V through a maximum at −0.05 V and a subsequent decrease to a high plateau at higher potentials. The conductivity (σ) at this maximum value was found to be $1.8 \times 10^{-2}$ S·cm$^{-1}$ for the film having a thickness of 245 Å. Qualitatively then, Poly(6) is about 8 times more conductive than Poly(5). Impedance measurements are currently underway to determine more precise values for the absolute conductivity of both Poly(5) and Poly(6).

EXAMPLE 26

Binding of Analytes

Figure 16:
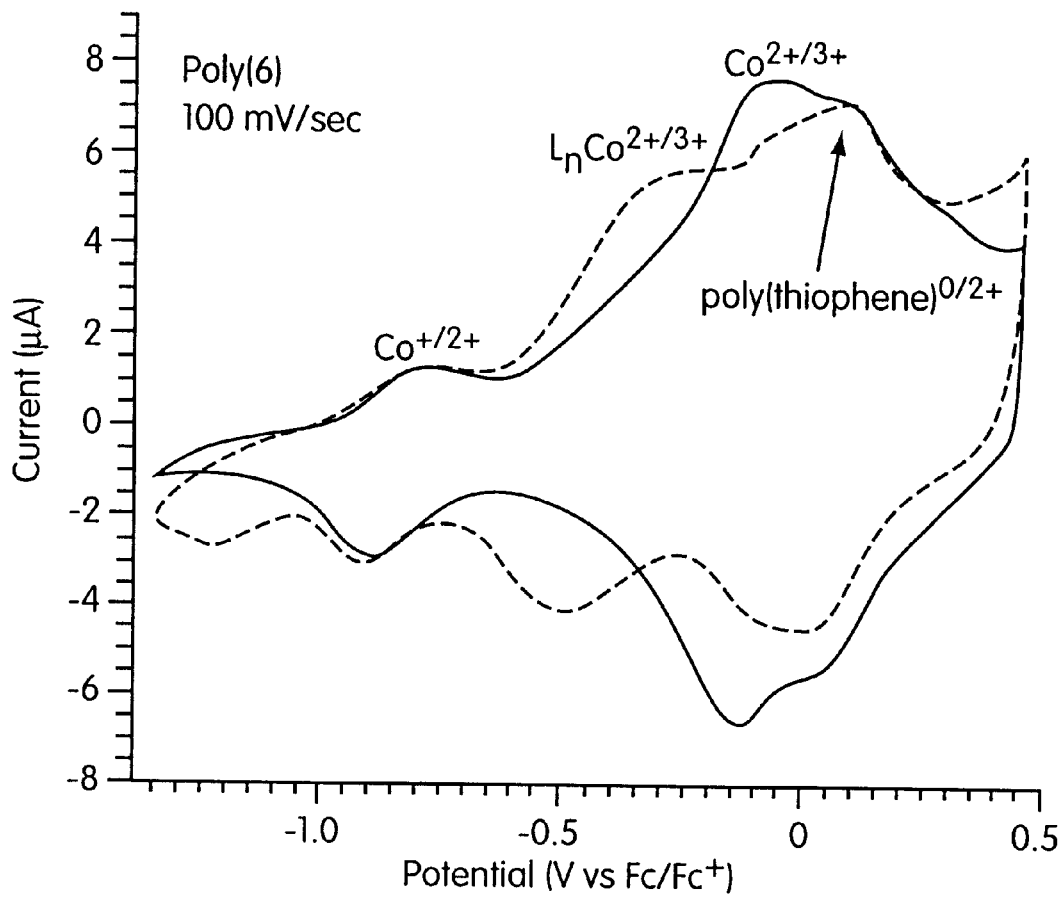
FIG. 16 displays cyclic voltammograms of Poly(6) before (solid line) and after (dashed line) addition of 2,3-lutidine to the electrolyte solution.

Lewis bases are known to reversibly shift the Co(II/III) wave to lower potentials and as shown in FIG. 16, 2,6-lutidine induces the appearance of a lower potential cobalt-centered wave as well as a corresponding decrease in the electroactivity of the combined metal/polymer-based waves. This indicates that there is indeed overlap between the metal oxidation potential and that of the polymer in the absence of a coordinating base. In thin films, this shift in the Co(II/III) potential is quantitative, but for films grown sufficiently thick to interconnect interdigitated microelectrodes, not all of the cobalt redox wave is observed to shift. This is most likely due to the polymer morphology which limits the ability of 2,6-lutidine to access all of the cobalt centers in the polymer matrix. There is also a significant drop in conductivity in the presence of Lewis bases. Electrochemistry in the presence of 2,6-lutidine (0.2 M) reduces the conductivity to approximately one-third of its value in pure acetonitrile (σ=$1.1 \times 10^{-4}$ S cm$^{-1}$) and electrochemical measurements performed in DMSO effectively reduces the conductivity to barely detectable levels with respect to the conductivity in acetonitrile (σ=$1.1 \times 10^{-4}$ S cm$^{-1}$ vs. $1.8 \times 10^{-2}$ S cm$^{-1}$, respectively).

What is claimed is:

1. A polymeric structure comprising:
   a first component comprising a plurality of organic units and a second component comprising a plurality of metal ions; and
   at least one conductive pathway comprising the first and second components, at least some of the metal ions of the second component located no more than three chemical bonds from any conductive pathway, wherein the redox potentials of the first and second components in the polymeric structure differ by no more than about 250 mV.

2. A polymeric structure as in claim 1, wherein the conductivity of the polymeric structure along the at least one conductive pathway is at least $10^{-4}$ S·cm$^{-1}$ as measured by an in situ two-point probe conductivity apparatus.

3. A polymeric structure as in claim 1, wherein the polymeric structure has a formula:

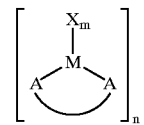

wherein M is a metal ion, n denotes a number of monomer units, n being at least 3, the polymeric structure comprising linkages through at least one atom in

and

and X are selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy, hydroxyl, hydroxyalkyl, amino, alkylamnino, dialkylamnino, arylamino, diarylamino, —NR$^1$COR$^2$, thioalkyl, thioaryl, —SO$_2$R$^1$, —SOR$^1$, —SO$_2$OR$^1$, F, Cl, Br, and I, R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I, and m=0–3.

4. A polymeric stucture as in claim 3, wherein the structure comprises a 1-, 2- or 3-dimensional array of n monomer units.

5. A polymeric structure as in claim 1, having a formula:

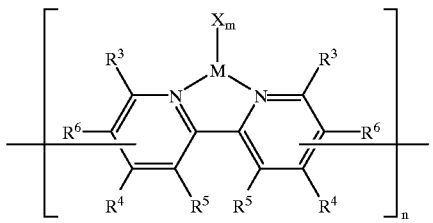

wherein M is a metal ion, n denotes a number of monomer units, n being at least 3, and the polymeric structure comprises linkages through at least one of any R$^3$–R$^6$ units or X and R$^3$–R$^6$ can be the same or different, and each is selected from the group consisting of hydrogen, C$_1$–C$_{10}$ alkyl, C$_1$–C$_{10}$ heteroalkyl, aryl, heteroaryl, carbonyl, acyl, acyloxy, —CHO, —COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, I, or where possible, any two R groups combining to form a ring structure; R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I; and X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, alkyloxy, aryloxy, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I; R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I, and m=0–3.

6. A polymeric structure as in claim 5, wherein the structure comprises a 1-, 2- or 3-dimensional array of n monomer units.

7. A polymeric structure as in claim 5, wherein R$^3$ or R$^6$ has the formula:

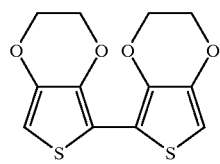

8. A polymeric structure as in claim 5, X having a formula:

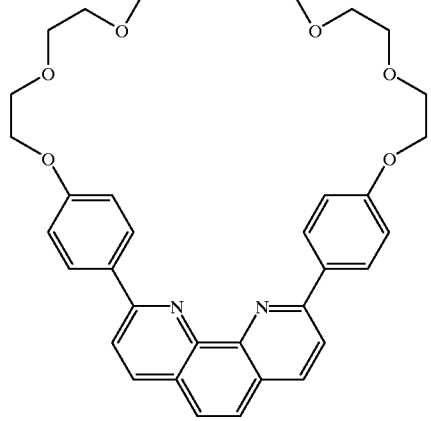

9. A polymeric structure as in claim 1, having a formula:

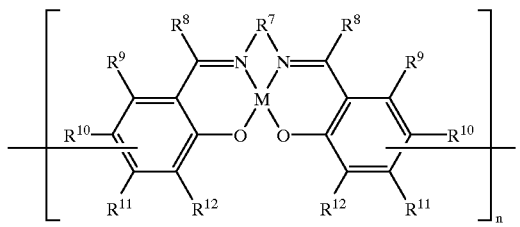

wherein M is a metal ion, n denotes a number of monomer units, n being at least 3, the polymeric structure comprising linkages through at least one of any R$^7$–R$^{12}$ units and R$^7$–R$^{12}$ can be the same or different, and each is selected from the group consisting of hydrogen, C$_1$–C$_{10}$ alkyl, C$_1$–C$_{10}$ heteroalkyl, aryl, heteroaryl, carbonyl, acyl, acyloxy, —CHO, COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thoaryl, —SO$_2$R$^1$, —SOR$^1$, —SO$_2$OR$^1$, F, Cl, Br, and I, or where possible, any two R groups combining to form a ring structure; R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I.

10. A polymeric structure as in claim 9, wherein the structure comprises a 1-dimensional or 2-dimensional array of monomer units.

11. A polymeric structure as in claim 9, wherein R$^{10}$ is:

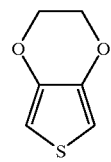

12. A polymeric structure as in claim 1, having a formula:

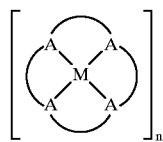

wherein M is a metal ion, n denotes a number of monomer units, n being at least 3, the polymeric structure comprising linkages through at least one atom in

and any

unit or X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy, hydroxyl, hydroxyalkyl, amino, alkylamino, dialkylainino, arylamino, diarylamino, —NR$^1$COR$^2$, thioalkyl, thioaryl, —SO$_2$R$^1$, —SOR$^1$, —SO$_2$OR$^1$, F, Cl, Br, and I; R$^1$ and R$^2$ can be the same or different, and each is selected from the group consisting of hydrogen, C$_1$–C$_{10}$ alkyl, C$_1$–C$_{10}$ heteroalkyl, aryl, heteroaryl, hydroxy, F, Cl, Br, and I, and m=0–2.

13. A polymeric structure as in claim 12, wherein the structure comprises a 1-, 2- or 3-dimensional array of n monomer units.

14. A polymeric structure as in claim 12, wherein the four

units constitute a macrocycle.

15. A polymeric structure as in claim 14, wherein the macrocycle is selected from the group consisting of cyclams, phthalocyanines and porphyrins.

16. A polymeric structure as in claim 1, wherein the metal ion is a transition metal ion.

17. A polymeric structure as in claim 1, wherein the structure is formable into a film by redox or chemical polymerization.

* * * * *